(12) United States Patent
Baker et al.

(10) Patent No.: US 8,354,462 B2
(45) Date of Patent: Jan. 15, 2013

(54) HEAT STABILIZERS CONTAINING HYDROTALCITE PARTICLES WITH SPECIFIC ZETA POTENTIALS THAT DEMONSTRATE IMPROVED PROCESSING AND PERFORMANCE IN MOLDED VINYL COMPOUNDS

(75) Inventors: Paulette Baker, Chagrin Falls, OH (US); Bernhard Georg Pelzl, Graz (AT); Herbert Schrunner, Arnoldstein (AT)

(73) Assignee: Chemson Polymer Additives AG, Arnoldstein (AT)

( * ) Notice: Subject to any disclaimer, the term of this patent is extended or adjusted under 35 U.S.C. 154(b) by 572 days.

(21) Appl. No.: 12/626,986

(22) Filed: Nov. 30, 2009

(65) Prior Publication Data

US 2011/0127066 A1 Jun. 2, 2011

(51) Int. Cl.
*C08K 5/00* (2006.01)
*C08K 5/09* (2006.01)

(52) U.S. Cl. ........................ 524/399; 524/301

(58) Field of Classification Search ............... 524/399
See application file for complete search history.

(56) References Cited

U.S. PATENT DOCUMENTS

| | | | |
|---|---|---|---|
| 3,879,523 A | 4/1975 | Miyata et al. | |
| 4,000,100 A | 12/1976 | Baldyga | |
| 4,458,026 A | 7/1984 | Reichle | |
| 4,904,457 A | 2/1990 | Misra | |
| 5,141,980 A | 8/1992 | Ranceze et al. | |
| 5,356,981 A * | 10/1994 | Tsuruga et al. | 524/413 |
| 5,399,329 A | 3/1995 | Schutz et al. | |
| 5,451,628 A | 9/1995 | Baker | |
| 5,578,286 A | 11/1996 | Martin et al. | |
| 6,156,830 A | 12/2000 | Wehner et al. | |
| 6,162,540 A | 12/2000 | Tsuji et al. | |
| 6,232,375 B1 | 5/2001 | Wehner et al. | |
| 6,287,532 B1 | 9/2001 | Okada et al. | |
| 6,313,208 B1 | 11/2001 | Nosu et al. | |
| 6,413,639 B1 * | 7/2002 | Kobayashi et al. | 428/403 |
| 6,514,473 B2 | 2/2003 | Noweck et al. | |
| 6,979,708 B2 | 12/2005 | Fujii et al. | |
| 7,211,235 B2 | 5/2007 | Eisgruber et al. | |
| 7,405,359 B2 | 7/2008 | Kobayashi et al. | |
| 2002/0006375 A1 | 1/2002 | Okada et al. | |
| 2009/0048374 A1 | 2/2009 | Fokken et al. | |
| 2009/0215950 A1 | 8/2009 | Miyata | |

FOREIGN PATENT DOCUMENTS

| | | |
|---|---|---|
| CA | 2218792 A1 | 4/1998 |
| DE | 3843581 | 7/1989 |
| EP | 0062813 | 10/1982 |
| EP | 0656634 A2 | 6/1995 |
| WO | 93/20135 | 10/1993 |
| WO | 2008050927 | 2/2008 |

OTHER PUBLICATIONS

Johan van der Laan, "Optimization of Hydrotalcite as Heat Stabiliser in Plasticised PVC", thesis, Apr. 2004.*
Optimization of Hydrotalcite as Heat Stabiliser in Plasticised PVC, thesis of Johan van der Laan, Apr. 2004.
Excerpts from "Five Chemicals Alternatives Assessment Study", The Massachusetts Toxics Use Reduction Institute, University of Massachusetts Lowell, Jun. 2006.
Brochure for "ALCAMIZER, Heat Stabilizer for PVC", Kyowa Chemical Industry Co., Ltd.

* cited by examiner

*Primary Examiner* — David W Wu
*Assistant Examiner* — Hui Chin
(74) *Attorney, Agent, or Firm* — Wood, Herron & Evans, LLP

(57) ABSTRACT

Particulate solid heat stabilizer compositions for vinyl halide polymers are provided having about 30% to 90% by weight hydrotalcite particles represented by a sigmoidal curve on a cartesian coordinate plot of zeta potential (mV) versus pH. The curve has negative zeta potential values balanced against positive zeta potential values over a pH range and an inflection point between a pH of about 3 about 6 representing the isoelectric point (IEP) between said negative and positive zeta potential values. The stabilizer compositions are essentially free flowing, storage stable, and processable upon mixing components of the composition for blending with a vinyl halide polymer in effective amounts to confer heat stabilizing effectiveness upon said polymer.

13 Claims, 10 Drawing Sheets

HEAT STABILIZERS CONTAINING HYDROTALCITE PARTICLES WITH SPECIFIC ZETA POTENTIALS THAT DEMONSTRATE IMPROVED PROCESSING AND PERFORMANCE IN MOLDED VINYL COMPOUNDS

FIELD OF THE INVENTION

This invention relates to heat stabilizers containing high concentrations of hydrotalcite on the order of about 30% to about 90% by weight. The stabilizers are essentially free-flowing, storage stable and processable with vinyl halide polymers to produce useful articles. Hydrotalcite particles for use in the composition have specific zeta potential properties that enable the stabilizer composition to have improved processing and performance upon molding with vinyl halide polymers.

BACKGROUND OF THE INVENTION

The use of hydrotalcite as a component in heat stabilizing molded vinyl compound is well established, for example, as disclosed in U.S. Pat. No. 6,313,208 (Kyowa), U.S. Pat. No. 5,451,628 (Synthetic Products), and U.S. Pat. Nos. 6,413,639 and 7,405,359 (Toda Kogyo). The volume of hydrotalcite used commercially for this purpose was not significant until EU directives ROHS (Restriction Of use of Hazardous Substances), REACH (Regulation on Registration, Evaluation, Authorization and Registration) and WEEE (Waste from Electrical & Electronic Equipment) regulated the use of lead and certain components present in tin and barium-zinc heat stabilizers. This, along with the current trends in eliminating volatile organic compounds and toxic metals, primarily in architectural applications, changed the direction in vinyl stabilization towards the increased use of hydrotalcite containing heat stabilizers.

The demand for hydrotalcite containing heat stabilizers was sudden and greater than supply. Suppliers could not produce enough and the world was searched for comparable material. Expectations in vinyl processing and performance were elevated in that the new hydrotalcite containing heat stabilizers had to equal that of the well established standards. The new hydrotalcite type replacement stabilizers stabilized adequately but many difficulties with processing and performance hampered the compliance effort.

During the powder mixing of the hydrotalcite containing heat stabilizers, product densities would drop, severely. This prevented normal filling of drums, bags and sacs. Container weights dropped as much as 50% which greatly affected manufacturing productivity. Compaction of the packaged heat stabilizer occurred during normal storage, producing hard lumps in the typically free flowing powder. This increased the amount of rejected finished product. Customers complained of "rat-holing" (bridging of the powder over an orifice which restricts flow of the material) in their transfer equipment during blending of their vinyl compounds when using these hydrotalcite containing heat stabilizers. They also complained of extreme screen pack build up of sand-like material (analyzed as only hydrotalcite without the other components of the heat stabilizer or vinyl compound) during extrusion. This forced considerable down time in their plants. Finished vinyl parts displayed inconsistent rough surfaces while difficulties in obtaining UL listing on THWN and THWN-2 wire formulations incorporating the hydrotalcite containing stabilizers made for an uncertain lead stabilizer replacement program.

Many explanations were created to fit the individual difficulties. There was no understanding that these problems could be interrelated. The difficulties mentioned above diminished with some sources as well as different lots of hydrotalcite as opposed to others. Hydrotalcites used to make commercial vinyl heat stabilizers are generally based on a magnesium and aluminum metal complex or a magnesium, zinc and aluminum metal complex. The anion in both cases is preferably a carbonate, a dispersing agent may be used during reaction and the finished hydrotalcite in both are surface treated with a metal carboxylate or carboxylic acid such as stearic acid (at a level between 0.5% and 5% with the range of 1.5% to 2.5% typically used). The typical pH range is 8.0-9.5, the $MgO/Al_2O_3$ ratio ranges from around 4-5 for the magnesium and aluminum metal complex and around 3-4 for the magnesium, zinc, and aluminum metal complex. The ZnO to $Al_2O_3$ metals ratio for this complex is around 1.0. The particle size is below 6 microns and the surface area (BET) is less than 30 m²/g. The hydrotalcite can also be calcinated.

Hydrotalcite incorporated in vinyl heat stabilizers is typically represented (but with slight molar ratio variations) as follows:

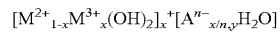

$[M^{2+}_{1-x}M^{3+}_x(OH)_2]_x{}^+[A^{n-}_{x/n}.yH_2O]$

"Chemical Society of Japan", 1995, no. 8, pp. 622 to 628 Typically, the two different types of hydrotalcite for vinyl applications can be written as follows:

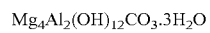

$Mg_4Al_2(OH)_{12}CO_3 \cdot 3H_2O$ and

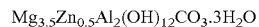

$Mg_{3.5}Zn_{0.5}Al_2(OH)_{12}CO_3 \cdot 3H_2O$

Hydrotalcite can be made via three typical procedures such as the co-precipitation method, the salt oxides method and the induced hydroxide method. These methods have been revealed in the following U.S. patents: U.S. Pat. No. 3,879,523 Kyowa, Apr. 22, 1975; U.S. Pat. No. 4,458,026, Union Carbide, Jul. 3, 1984; U.S. Pat. No. 4,904,457, Aluminum Co. of America, Oct. 18, 1984; U.S. Pat. No. 5,399,329, Aristech Chemical Corp., Mar. 21, 1995; U.S. Pat. No. 5,578,286, Aluminum Co. of America, Nov. 26, 1996; U.S. Pat. No. 6,287,532, Kyowa, Sep. 17, 1999; U.S. Pat. Nos. 6,413,639 and 7,405,359, Toda Kogyo, Jul. 2, 2002; U.S. Pat. No. 6,514,473, Sasol, Feb. 4, 2003; U.S. Pat. No. 7,211,235, Sud Chemie AG, May 1, 2007; WO/2008/050927, Shin Won Chemical Co. LTD., Feb. 5, 2008.

A typical vinyl heat stabilizer formulated with hydrotalcite can contain alkaline earth and metal carboxylates (such as Ba, Ca, Mg, K, Li, Na, Sr, Ce, Sn, Al, Zn, La and rare earth metals), uracils, antioxidants, beta diketones and aceto acetonates, polyols, hydroxyl containing isocyanurate, alcohols, perchlorates, melamine, alkaline earth and metal oxides, alkaline earth and metal hydroxides, zeolites, silicates, and lubricants (such as paraffin, fischer tropsch and polyethylene waxes, esters, amides, $C_{10}$-$C_{30}$ carboxylates) among other ingredients and as described in U.S. Pat. Nos. 6,313,208, 6,413,639, and 7,405,359, to list a few. These components are powders with the process of manufacturing a commercial vinyl heat stabilizer being a simple powder blend with no intended reaction. However, as the hydrotalcite concentration within the heat stabilizer increases from about 30% to 90% by weight, higher degrees of instability and processing problems, as described above, are associated with the higher percentages of hydrotalcite used.

SUMMARY OF THE INVENTION

This invention is directed to a storage stable and processable particulate solid heat stabilizer composition for a vinyl halide polymer. The composition comprises a particulate solid heat stabilizer and hydrotalcite particles contained in the composition in an amount of about 30% by weight to about 90% by weight of the total composition solids. It has been found that the instability and processing difficulties associated with higher percentages of hydrotalcite used in the stabilizer compositions are overcome by the use of hydrotalcite particles possessing specific zeta potential properties.

In particular, it has been found that problems associated with stabilizers having high percentages of hydrotalcite are prevented by using hydrotalcite particles having zeta potentials represented by a sigmoidal curve on a cartesian coordinate plot of zeta potential (mV) versus pH. The curve has negative zeta potential values balanced against positive zeta potential values over a pH range, with an isoelectric point (IEP) between the positive and negative zeta potential values, at a pH of about 3 and about 6. Particulate solid stabilizer compositions formulated with the specified hydrotalcite particles are essentially free-flowing, storage stable and processable for high-intensity mixing in effective amounts with a vinyl halide polymer to confer heat stabilizing effectiveness upon the polymer.

This invention is also directed to a method of making a processable composition and blending the composition with a vinyl halide polymer to overcome the processing difficulties identified above. According to this method, hydrotalcite particles having the most preferred sigmoidal curve properties are first identified. Then, the identified particles are mixed with a solid stabilizer to form the stabilizer composition having the stable and processable advantages of this invention. The mixing step can be conducted together with blending the stabilizer in the presence of the vinyl halide polymer to stabilize it during processing.

Vinyl halide polymer compositions containing the particulate solid stabilizer composition of this invention are processable under high-intensity mixing to produce useful molded vinyl halide polymer parts. For example, electrical insulating vinyl halide polymer parts, such as wire or cable, are successfully produced employing the particulate solid stabilizer compositions without the processing difficulties and disadvantages of stabilizers containing hydrotalcites as developed in the background above.

DETAILED DESCRIPTION OF THE INVENTION

A. Vinyl Halide Polymer

The vinyl halide polymer employed is most commonly a homopolymer of vinyl chloride, i.e. polyvinyl chloride. It is to be understood, however, that this invention is not limited to a particular vinyl halide polymer such as polyvinyl chloride or its copolymers. Other halogen-containing resins which are employed and which illustrate the principles of this invention include chlorinated polyethylene, chlorosulfonated polyethylene, chlorinated polyvinyl chloride, and other vinyl halide polymer types. Vinyl halide polymer, as understood herein, and as appreciated in the art, is a common term and is adopted to define those resins or polymers usually derived by polymerization or copolymerization of vinyl monomers including vinyl chloride with or without other comonomers such as ethylene, propylene, vinyl acetate, vinyl ethers, vinylidene chloride, methacrylate, acrylates, styrene, etc. A simple case is conversion of vinyl chloride $H_2C=CHCl$ to polyvinyl chloride $(CH_2CHCl-)_n$ wherein the halogen is bonded to the carbon atoms of the carbon chain of the polymer. Other examples of such vinyl halide polymers would include vinylidene chloride polymers, vinyl chloride-vinyl ester copolymers, vinyl chloride-vinylidene copolymers, vinyl chloride-propylene copolymers, chlorinated polyethylene, and the like. Of course, the vinyl halide commonly used in the industry is the chloride, although others such as bromide and fluoride may be used. Example of the latter polymers include polyvinyl bromide, polyvinyl fluoride, and copolymers thereof.

B. Solid Heat Stabilizers

Solid inorganic, organometallic and organic stabilizers, and mixtures thereof are very well known for stabilizing vinyl halide polymers. For example, metal, inorganic and organic based compound heat stabilizers are used in vinyl halide polymer compositions. These stabilizers serve to prevent dehydrohalogenation during heat processing of the vinyl halide resin composition into its final shape. Normally, mixed metal salts, inorganic and organic based compounds are employed as heat stabilizing compositions. A mixed barium-zinc or calcium-zinc salt or a uracil based organic compound may be employed. The salt component of "metal soaps" can also be from lithium, sodium, potassium, magnesium, calcium, strontium, barium, zinc, aluminum, lanthanum, cerium, tin, rare earth metals and mixtures thereof. The salt components are usually metal salts of a carboxylic acid, advantageously of a $C_6$-$C_{24}$ carbon chain link mono-, di-, tri-, and tetravalent carboxylic acid such as lauric, stearic, pelargonic, palmitic, myristic, fumaric, benzoic, behenic, terephthalic, citric, hydroxystearic salts or similar carboxylic acids. Mixed barium/zinc or calcium/zinc salts of such acids, and their preparation, are familiar to those skilled in the art to which this present invention pertains. Organic stabilizers have also been used as exemplified by aminopyrimidinones, aminouracils, etc., as disclosed in U.S. Pat. No. 6,156,830 and U.S. Pat. No. 6,232,375. Metal soaps are conventionally used as disclosed in the '830 patent. Other stabilizers are used as disclosed in U.S. Pat. No. 4,000,100 and U.S. Pat. No. 6,413,639. These patents are incorporated herein by reference to illustrate conventional solid stabilizers which may be used in this invention. The stabilizers are used in an amount from about 0.5 to about 15 parts per 100 parts by weight of polymer.

C. Hydrotalcites

The chemical composition of these compounds is known to the person skilled in the art, for example, from patents DE 3,843,581; EP 0062813; WO 93/20135; U.S. Pat. No. 6,287,532, U.S. Pat. No. 6,313,208, U.S. Pat. No. 6,156,830; U.S. Pat. No. 6,979,708; and U.S. 2002/0006375 A1.

Compounds from the series of the hydrotalcites can be described by the following general formula:

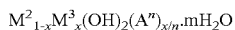

$$M^2{}_{1-x}M^3{}_x(OH)_2(A^n)_{x/n}.mH_2O$$

where
$M^2$=one or more metals from the group Mg, Ca, Sr, Zn, and Sn,
$M^3$=Al, or B
$A^n$ is an anion having the valency n, n is a number from 1-2,
$0<x\leq0.5$
m is a number from 0-20.
Preferably
$A^n$=$OH^-$, $ClO_4^-$, $HCO_3^-$, $CH_3COO^-$, $C_6H_5COO^-$, $CO_3^{2-}$, $(CHOHCOO)_2^{2-}$, $(CH_2COO)_2^{2-}$, $CH_3CHOHCOO^-$, $HPO_3^-$, $HPO_4^{2-}$, or $SO_4^-$ The most preferred hydrotalcite source requirements are:
1. Fits within the general formulations $Mg_4Al_2(OH)_{12}CO_3.3H_2O$ or calcinated version or $Mg_{3.5}Zn_{0.5}Al_2(OH)_{12}CO_3.3H_2O$
2. Has a $MgO/Al_2O_3$ ratio of about 4 to 5 or a $MgO/Al_2O_3$ ratio of about 3 to 4 along with a $ZnO/Al_2O_3$ ratio around 1.0.

3. The average particle size is below 6 microns.
4. The surface area (BET) is less than 30 m$^2$/g, preferably around 10 m$^2$/g.
5. The pH is between 8.0 and 9.6.
6. Presence of surface treatment with stearic (preferably between 1.0% and 3.0%).
7. Displays commercially desirable dynamic heat stability in a typical vinyl formulation.

It is to be understood, however, in its broadest aspects, this invention is directed to the use of hydrotalcite particles having zeta potentials that demonstrate improved processing and performance as represented by the sigmoidal curve over a pH range having an inflection point between a pH of about 3 and 6 representing the IEP. Most preferably, the particles are coated, for example, as described in U.S. Pat. No. 6,413,639 to facilitate dispersibility in the polymer, and this patent is incorporated herein by reference. Coatings such as rosins, organosilanes and fatty acids have been used for this purpose. Fatty acids or fatty acid salts are mostly preferred as a coating according to this invention. The most preferred hydrotalcites are known as Mg/Al-based hydrotalcites. The hydrotalcite particles are in an amount of about 0.2 to about 13.5 parts based on 100 parts by weight of polymer.

D. Other Additives

Other additives include uracils, antioxidants, beta diketones and aceto acetonates, polyols, hydroxyl containing isocyanurate, alcohols, perchlorates, melamine, alkaline earth and metal oxides, alkaline earth and metal hydroxides, zeolites, silicates, and lubricants (such as paraffin, fischer tropsch and polyethylene waxes, esters, amides, $C_{10}$-$C_{30}$ carboxylates) among other ingredients and as described in U.S. Pat. No. 6,313,208 (Kyowa); U.S. Pat. No. 5,451,628 (Synthetic Products), and U.S. Patent Application 2009/0048374 (Baerlocher), to list a few.

The invention overcomes or prevents the following difficulties associated with various sources of hydrotalcites used in vinyl stabilization:
1. drastic decrease in the density of the finished powder vinyl heat stabilizer;
2. increased compaction of the packaged powder heat stabilizer upon normal storage;
3. "rat holing", e.g. bridging of the vinyl heat stabilizer powder when conveyed to a silo, blender or packaging unit;
4. build up on screen packs during extrusion of the vinyl formulation containing the vinyl heat stabilizer.
5. poor surface qualities on vinyl parts; and
6. difficulties in obtaining UL THWN and THWN-2 wire listing.

For purposes of this invention, the terms "storage stable and processable" in this specification and claims are meant to define particulate solid stabilizer compositions of this invention which overcome or prevent the above difficulties in vinyl stabilization.

This invention is predicated, in part, upon understanding the change in the repelling and attracting forces of hydrotalcite particles while its medium undergoes constant change. While not desiring to be bound by theory, the invention may be better understood with reference to the following facts. Even though bulk solids such as hydrotalcite containing vinyl heat stabilizers have lower free energy while in the static state, they can be induced into a state of higher free energy through the action of mixing, conveying, compressing and heating. An electrical charge due to the presence of either static electricity, or through the build up of HCl during vinyl processing, or as current forced directly through insulated wire while in water, may also be applied to the stabilizer medium as it endures these higher energy forces. To observe the charge of the hydrotalcite as its medium (heat stabilizer in higher free energy) is undergoing changes in its charge was believed to closely resemble the change in charge that a solid particle would experience when the water (medium of higher free energy) that surrounds it undergoes a change in pH (charge). This belief led to the consideration and identification of zeta potentials of the hydrotalcite particles. Zeta potential is a physical property that can be tested, graphed [charge in millivolts (mV) of the particle surface versus the change in charge (pH) of the aqueous medium] and the isoelectric point determined. It was found that the above described adverse phenomena in processing hydrotalcite-containing stabilizers could be overcome or prevented by developing an acceptable range of isoelectric points and zeta potentials for the hydrotalcite particles.

According to this invention, the zeta potential of the hydrotalcite particles was practically applied to the phenomena listed above to determine whether the vinyl stabilizer (medium) becomes more negatively charged, neutral or positively charged when subjected to the forces described in each of the phenomena. It was found that particulate solid stabilizer compositions were free flowing, storage stable and processable upon high-intensity mixing of the stabilizer components and blending the composition with vinyl halide polymers when the hydrotalcite particles were represented by a sigmoidal curve on a cartesian coordinate plot of zeta potential (mV) versus pH of the particles dispersed in the suspending/dispersing medium (generally water). The curve has negative zeta potential values balanced against positive zeta potential values over a pH range. The curve also has an inflection point between a pH of about 3 to about 6, representing the isoelectric point (IEP) between the negative and positive zeta potential values.

The most preferred group of zeta potential sigmoid curves demonstrating the most improved processing and performance has been established by this invention. The most preferred group of curves has negative zeta potential values at a pH of about 7 between about −60 mV and about −20 mV balanced against positive zeta potential values at a pH of about 3 between about 20 mV and about 45 mV with an IEP at a pH of about 3 to about 6. One preferred zeta potential sigmoid curve for improving the processing and performance should meet the criteria where the negative potential value at a pH of about 7 is about −35 mV, and the positive zeta potential value at a pH of about 3 is about 35 mV, where the inflection point is at a pH of about 5. Notwithstanding this one zeta potential curve, the most preferred group of zeta potential curves has been established by empirical data and offers the best mode of practicing the invention.

The invention will be better understood with reference to the following detailed description of hydrotalcite models, application supporting data, screening stability, categorizing the hydrotalcite sources, processing and performance parameters, and summary of results with reference to the drawings.

ZETA POTENTIAL CURVES OF HYDROTALCITE MODELS DEMONSTRATING THE INVENTION

To help explain the above adverse phenomena seen in the field with stabilizers containing the various hydrotalcite sources and also with lot to lot variations within the same source of hydrotalcite, three models were developed to show the zeta potential sigmoid curves of hydrotalcites that are improvements in processing and performance (Model A), those that are borderline in processing and performance (Model B) and those that demonstrate the processing and performance difficulties discussed above (Model C).

Model A (Improved Processing and Performance):

A preferred hydrotalcite having a zeta potential sigmoid curve for improved processing and performance according to this invention should meet the following criteria:
when x=pH 3.0, y=35 mV;
when x=pH7.0, y=−35mV
IEP=5.0

Figure 1:
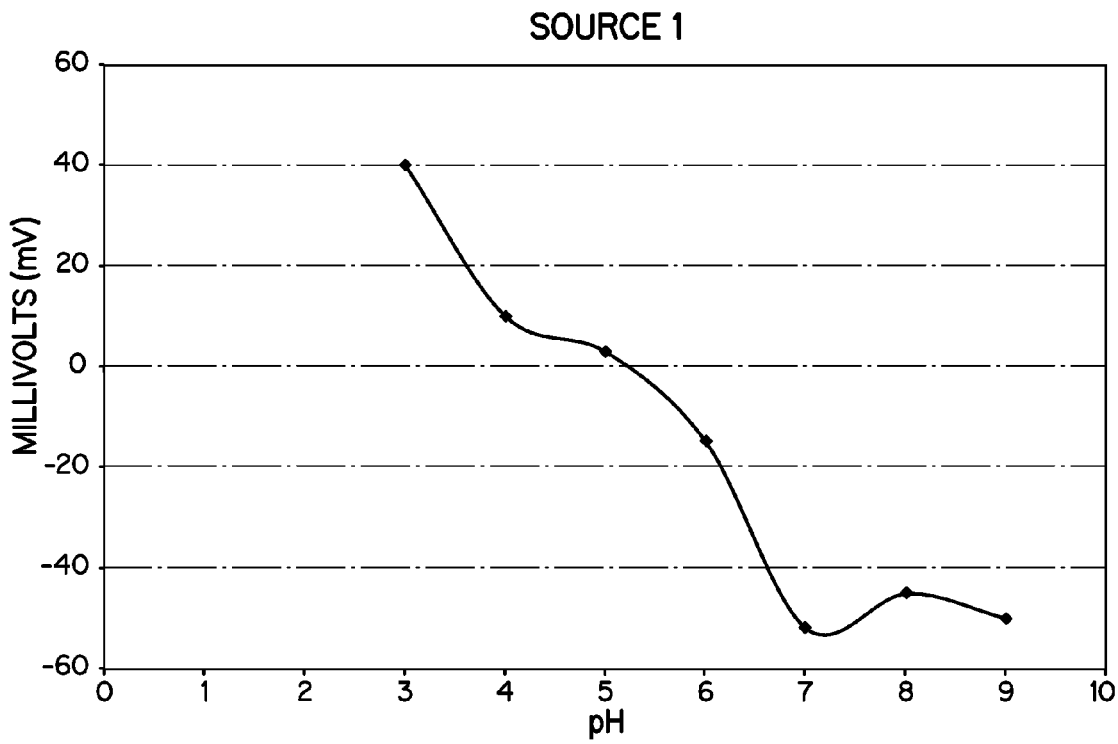
FIGS. 1-17 are zeta potential curves for various hydrotalcite sources identified in Table 1 as commercial sources of hydrotalcites.
Figure 2:
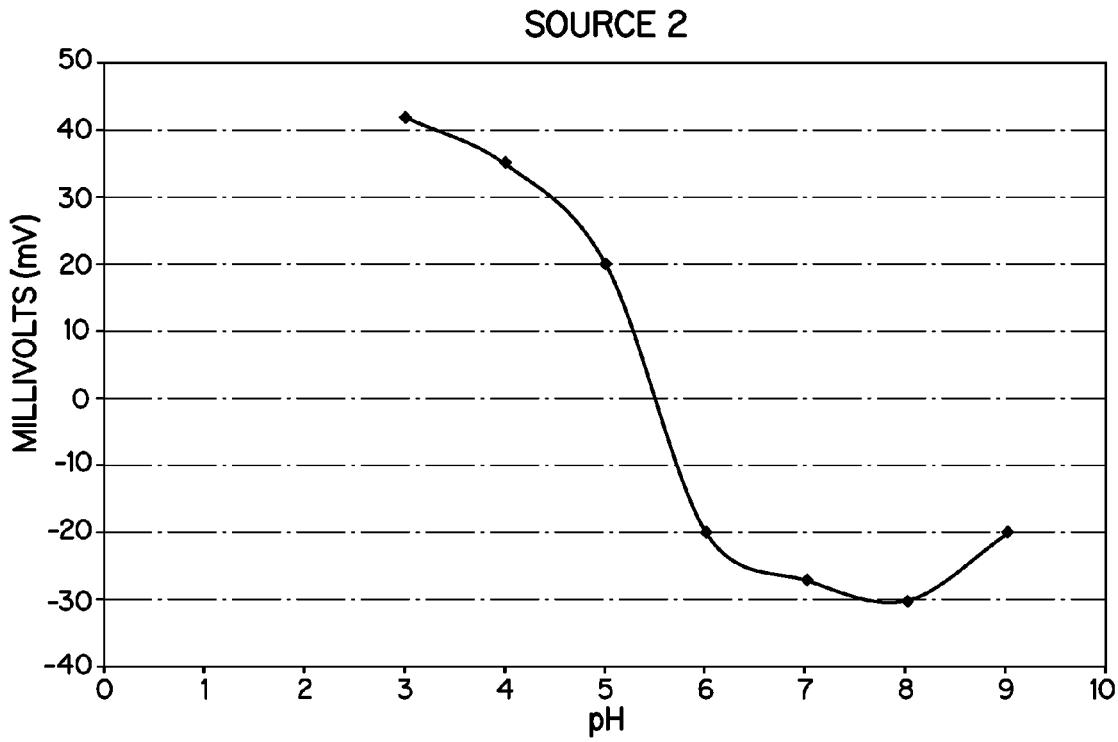
Figure 3:
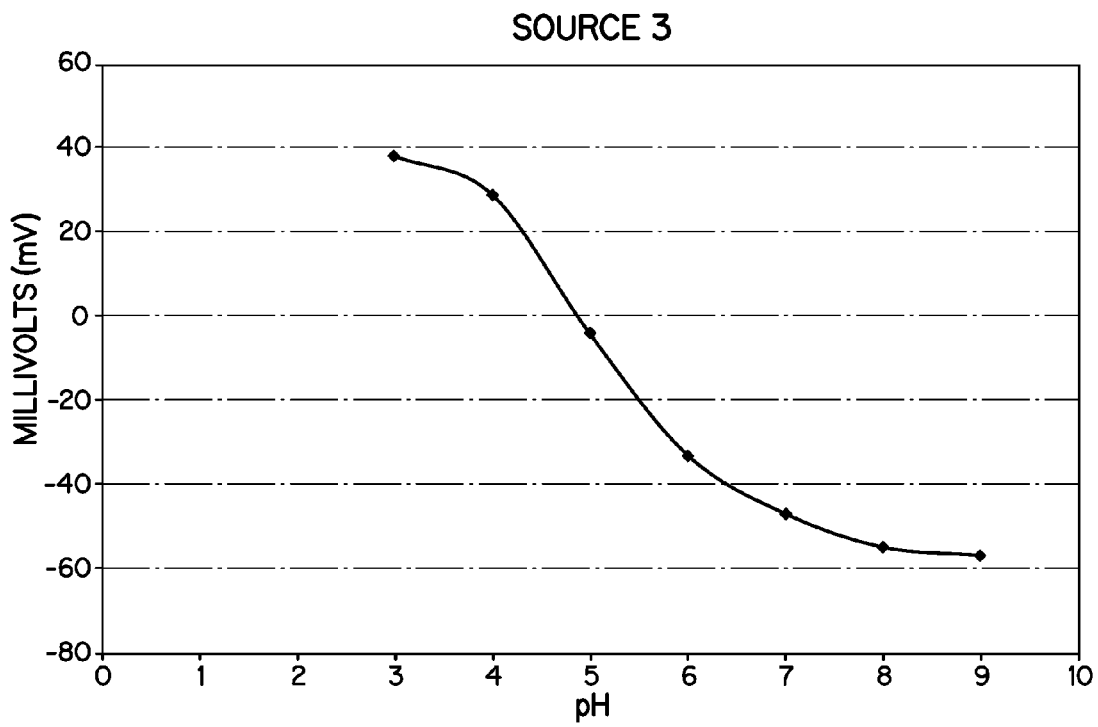
Figure 4:
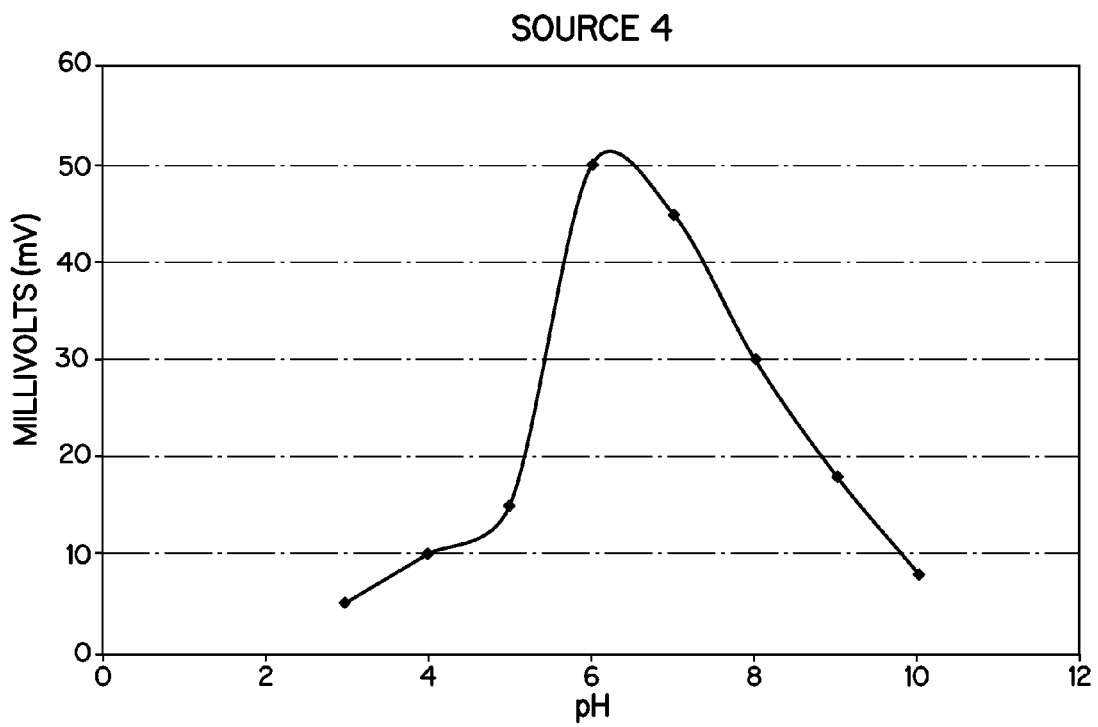
Figure 5:
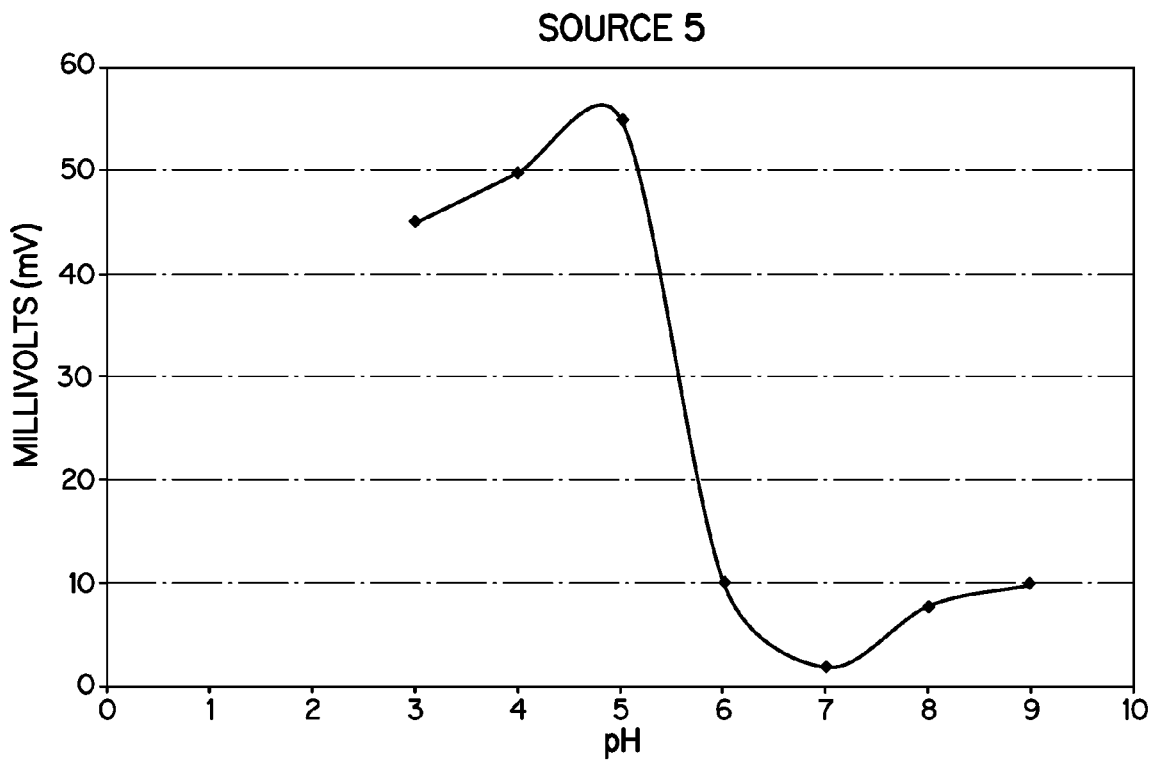
Figure 6:
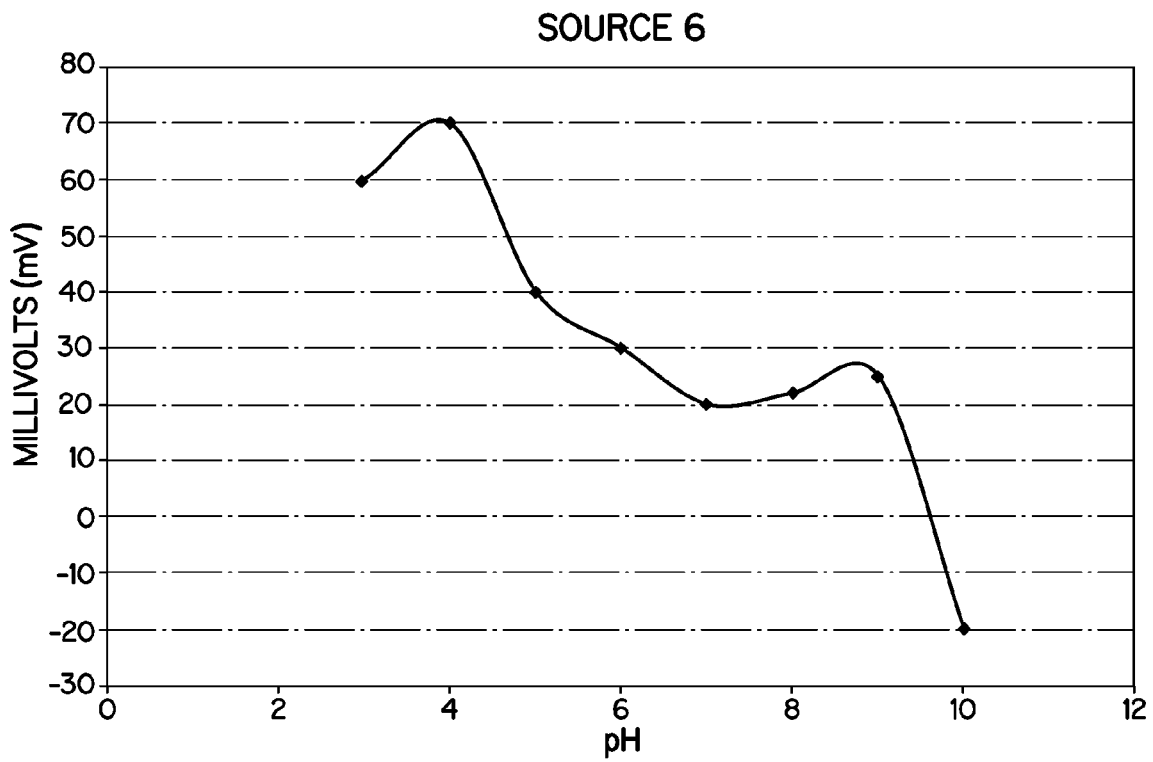
Figure 7:
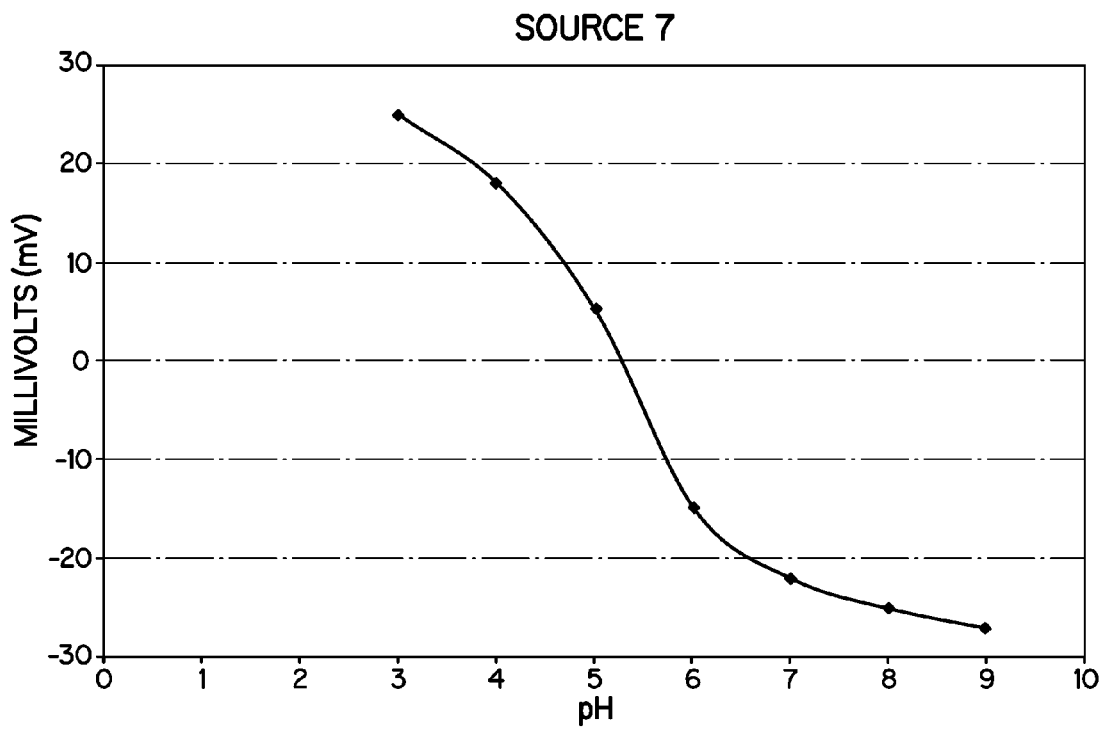
Figure 8:
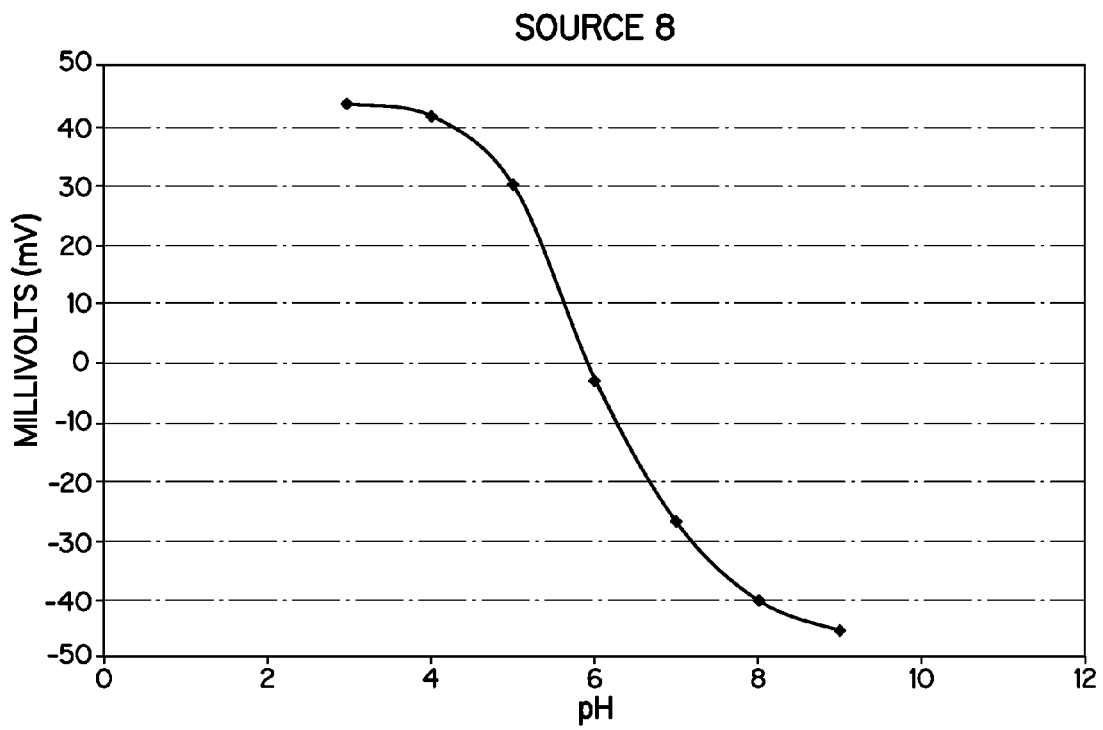
Figure 9:
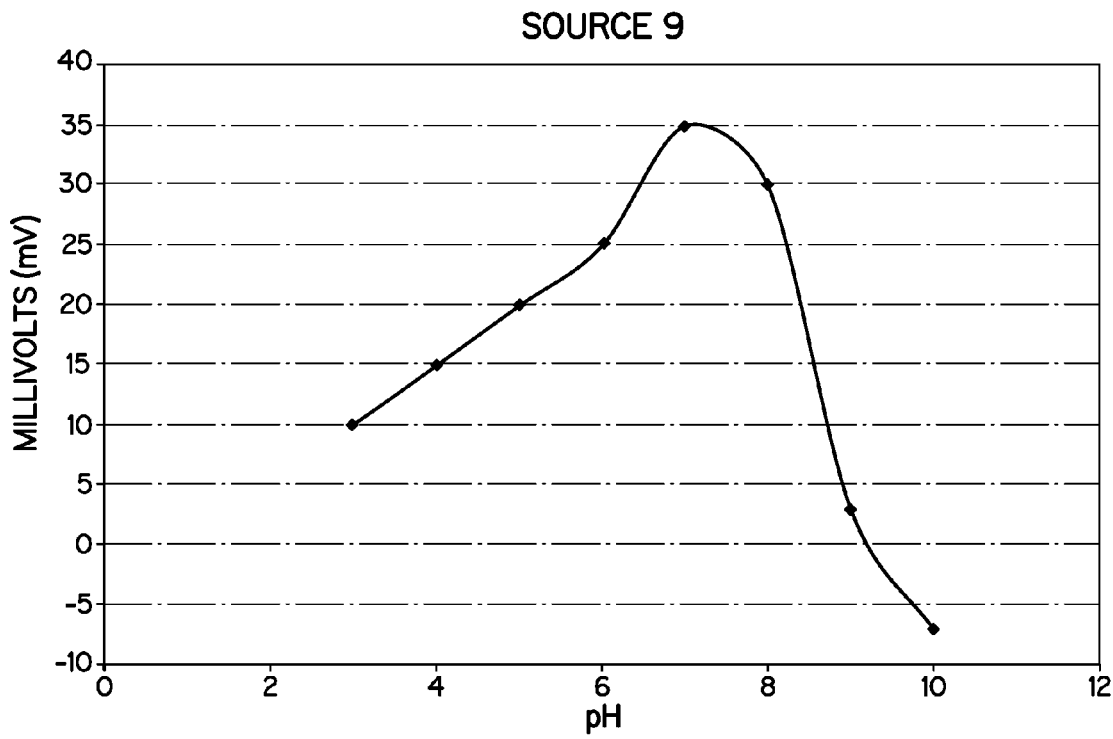
Figure 10:
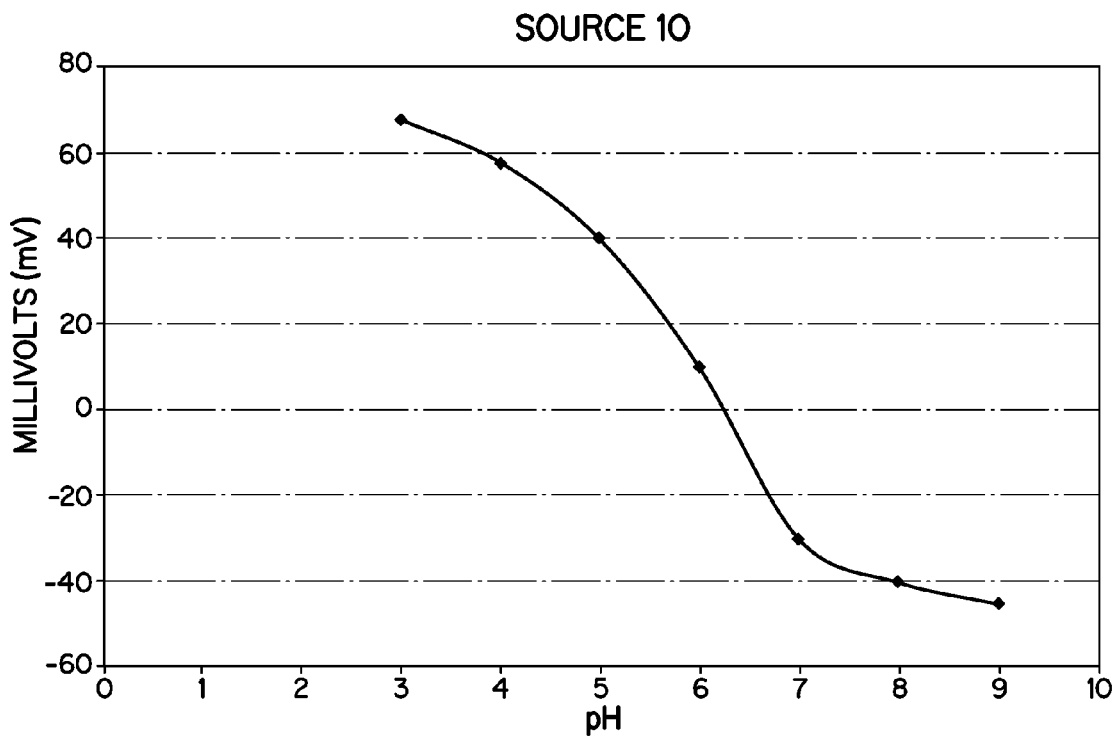
Figure 11:
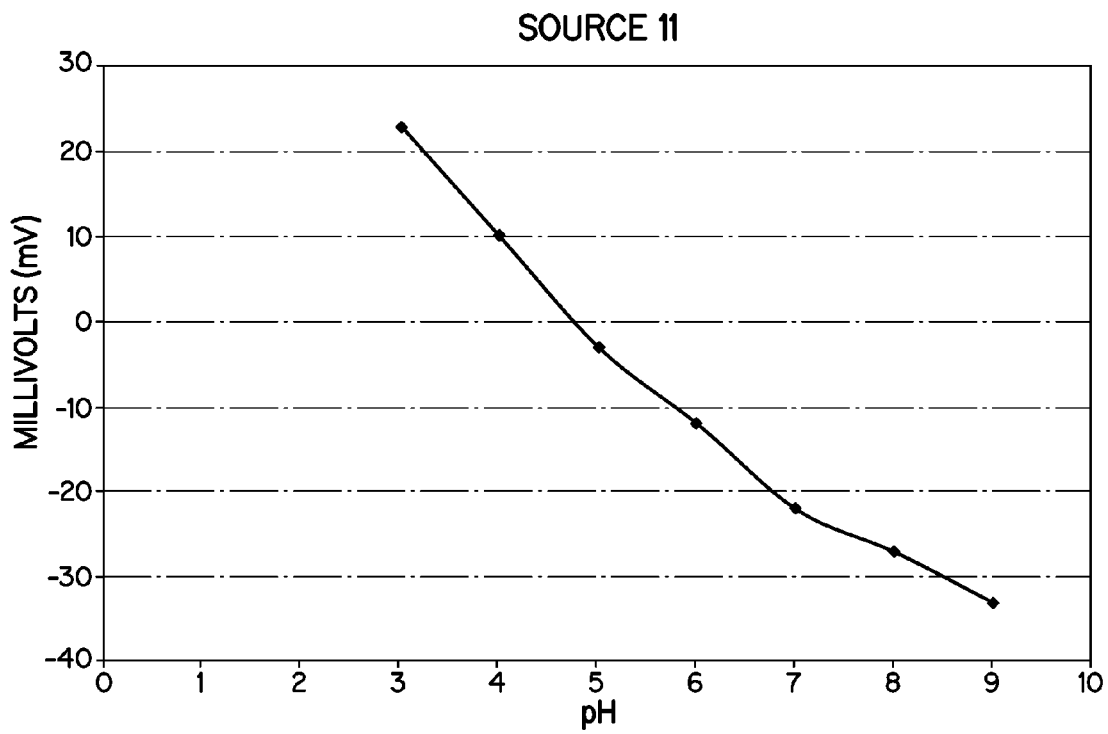
Figure 12:
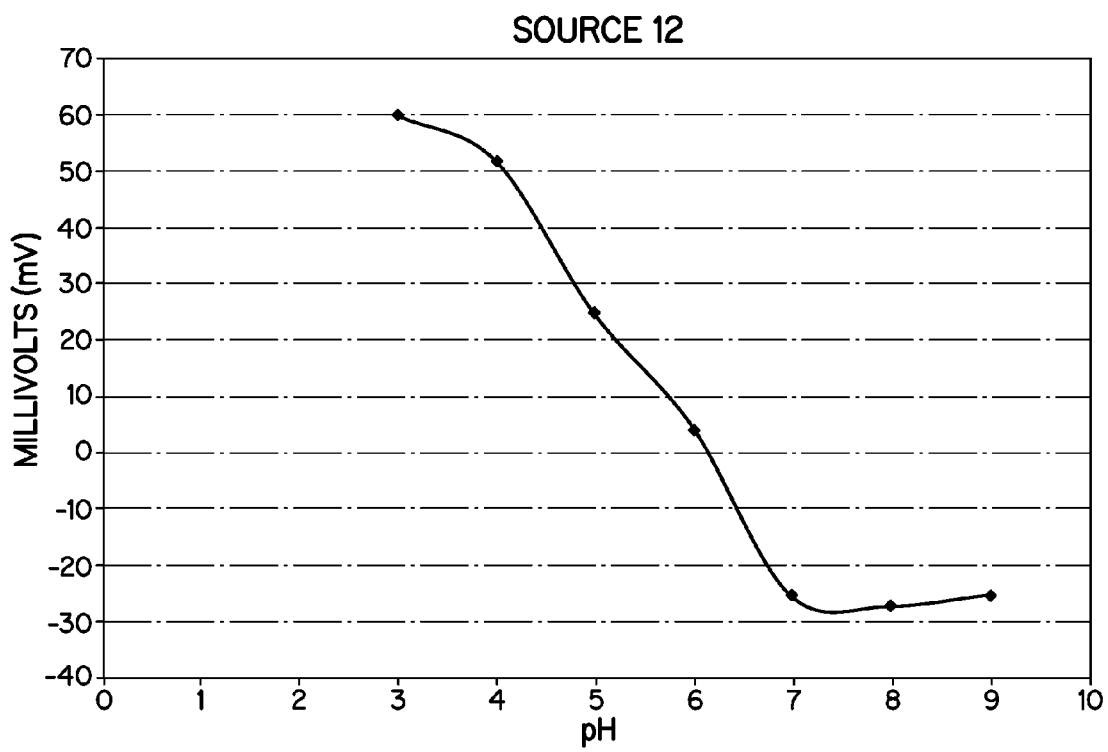
Figure 13:
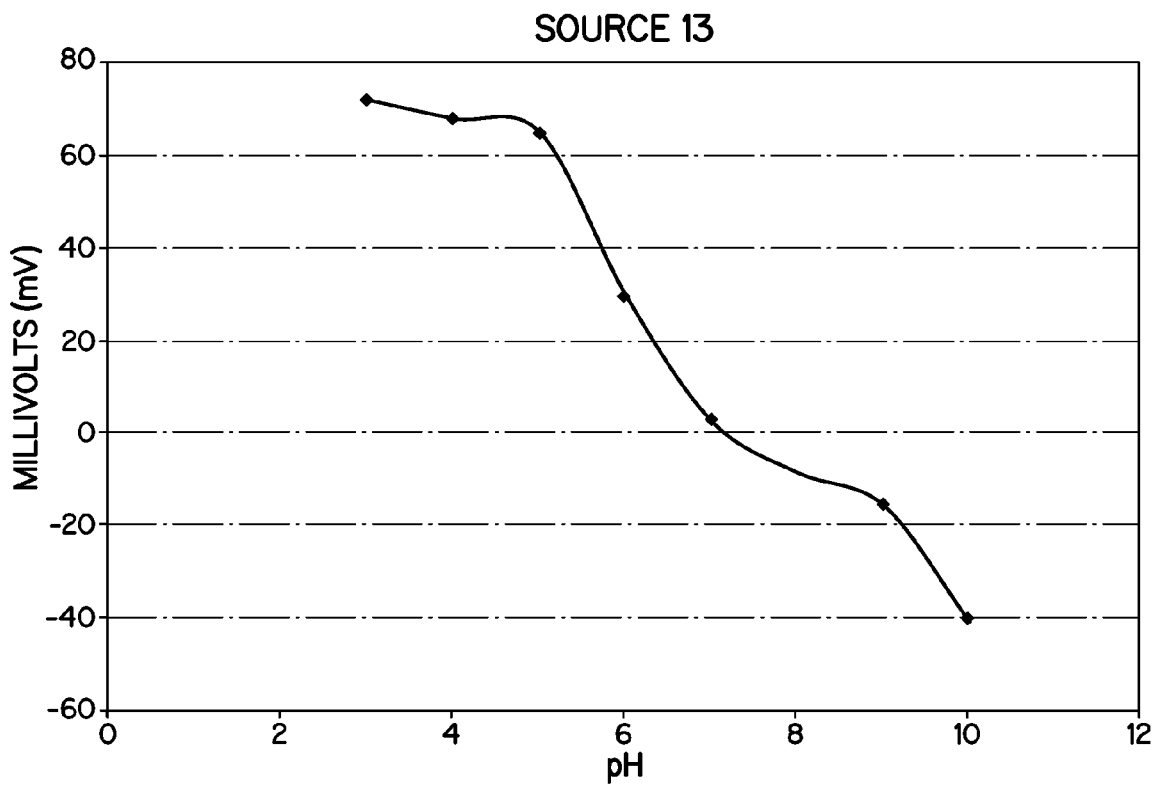
Figure 14:
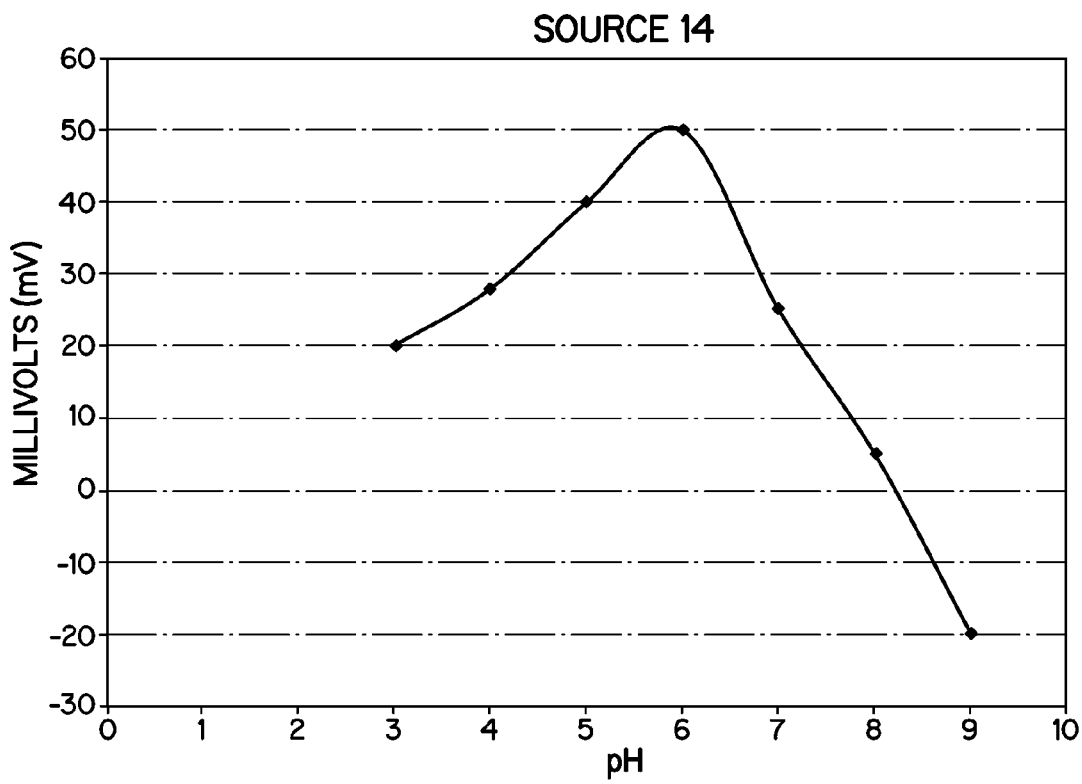
Figure 15:
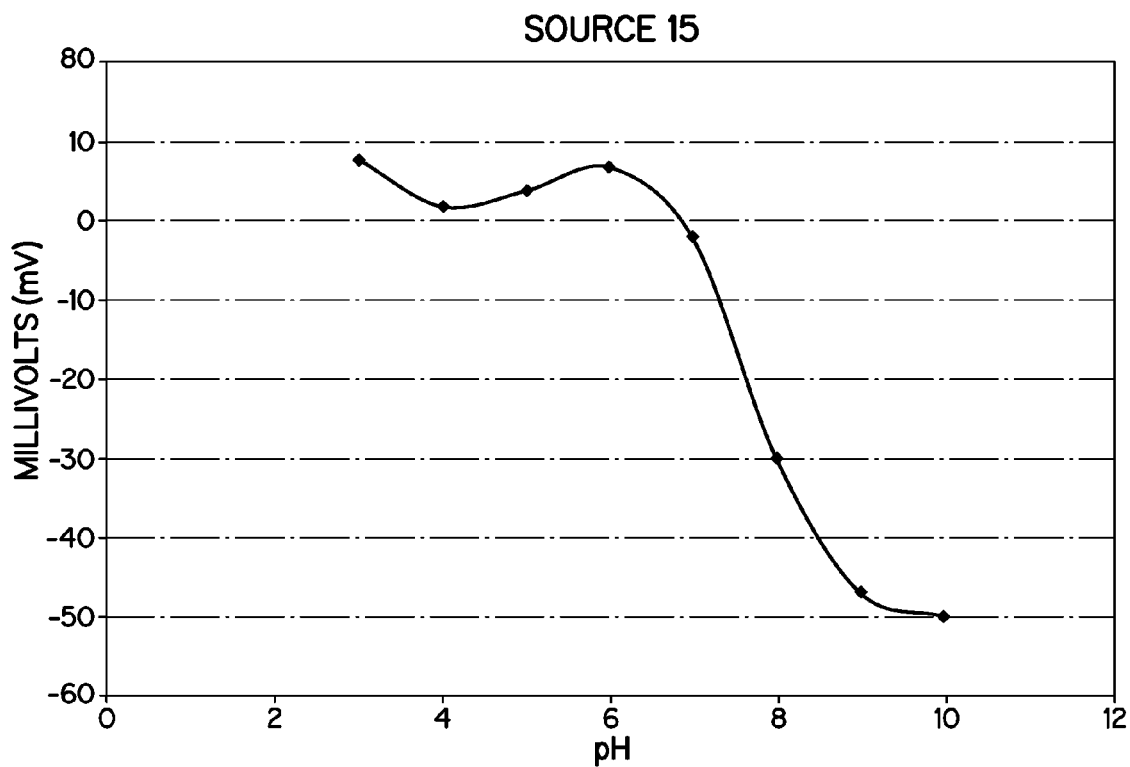
Figure 16:
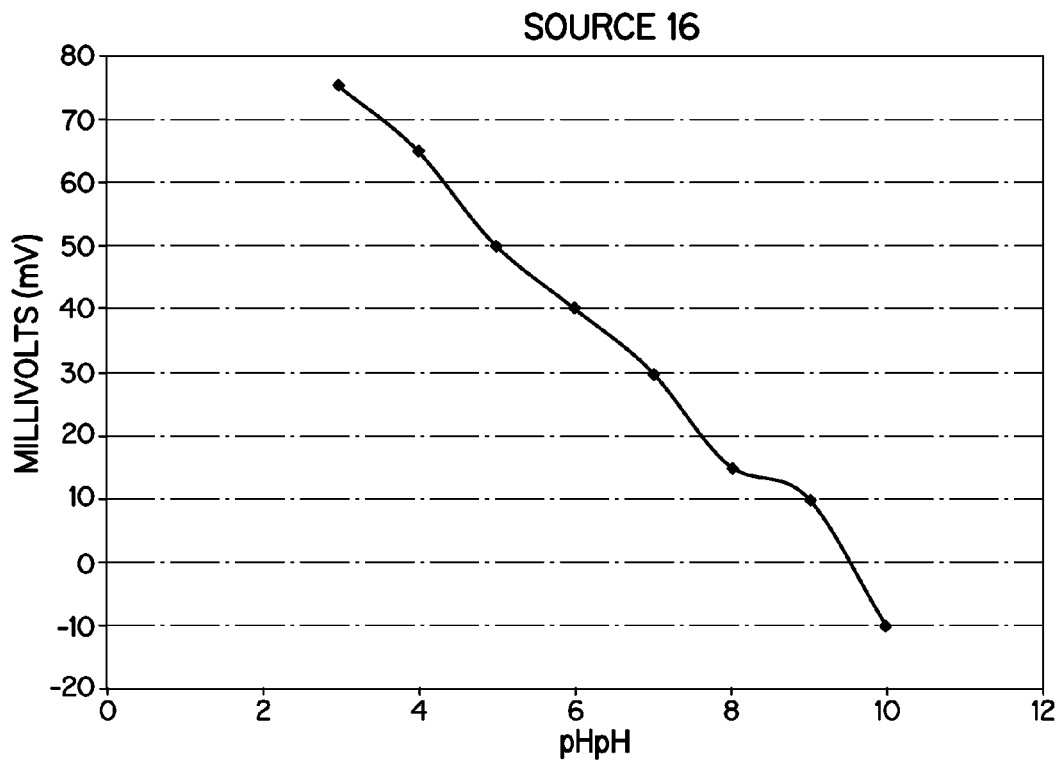
Figure 17:
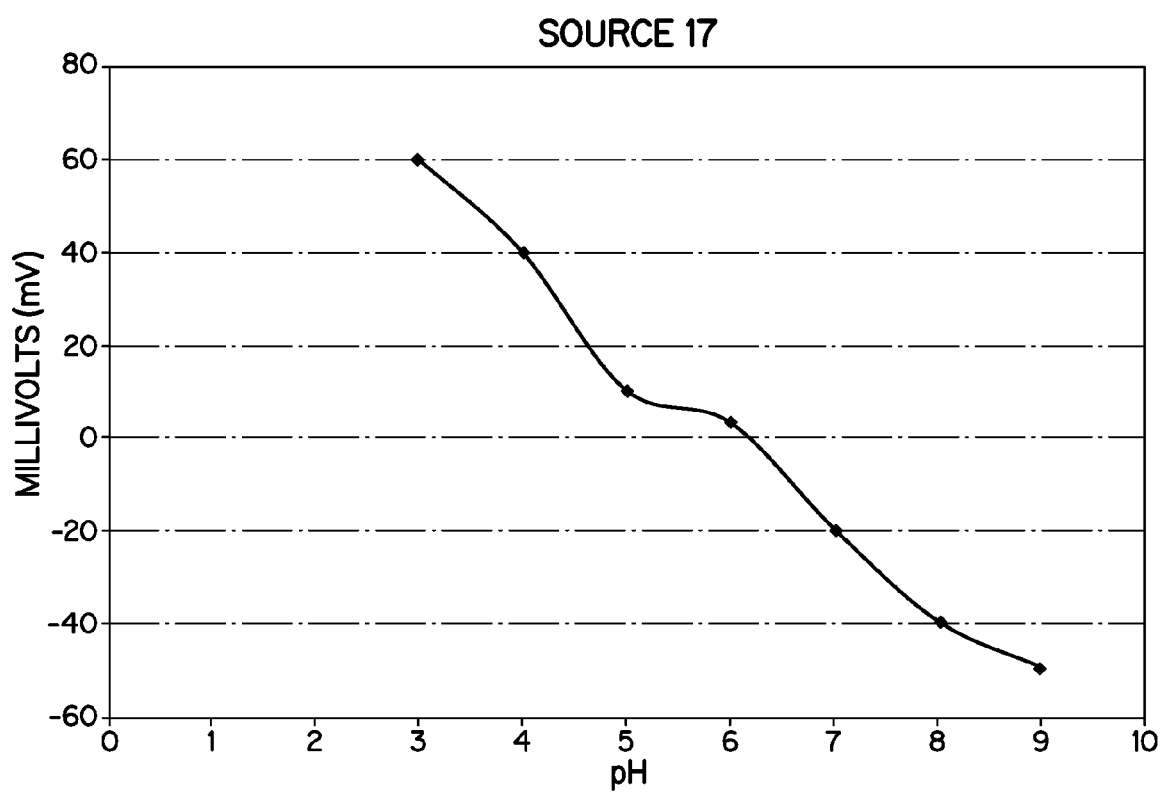
Figure 18:
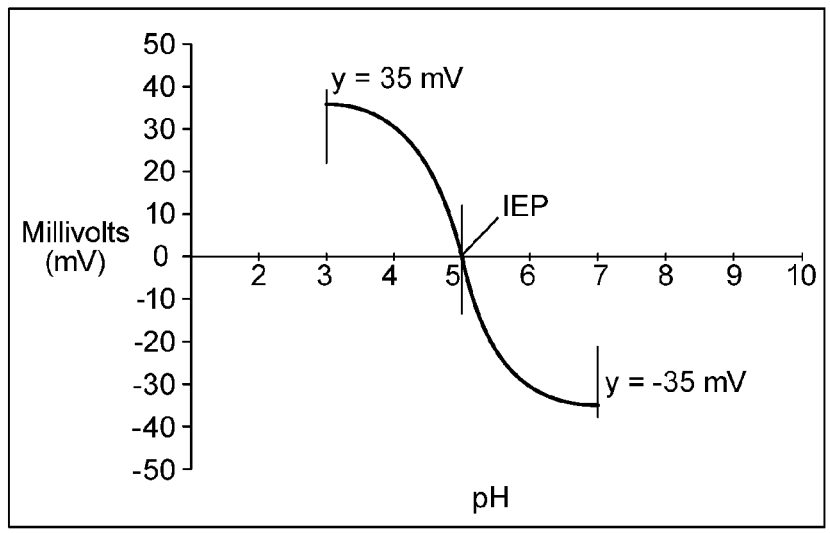
FIGS. 18-20 represent Models A, B, and C as described hereinafter. The curves are graphs on a cartesian coordinate plot of zeta potential (y axis) versus pH (x axis).

The criteria for categorizing sigmoid zeta potential curves into a most preferred Model A group of curves are as follows with reference to FIG. 18. Model A represents a preferred sigmoid curve for zeta potential forces that represent the hydrotalcite sources with improved processing and performance. The isoelectric point falls at about pH 5.0 as represented in FIG. 18.
when x=pH 3.0, y is >20 mV but ≦45 mV
when x=pH 7.0, y is >−60 mV but <−20 mV
IEP=>pH 3 but <pH 6

Model C (Difficulties in Processing and Performance)

The zeta potential curve, below (Model C), belongs to one of the hydrotalcite sources that displayed the difficulties discussed earlier. The isoelectric point is at pH of 8 instead of pH of about 3 to 6. There is no symmetry or balance of force intensity and at the critical processing and performance area (around pH 3), attractive forces are evident. There is a disparity between the intensity of force from pH 7 to pH 3 which may explain density issues. The attractive forces in the area of pH 3 will give a phenomena called "blender balls" when high intensity mixing.

Figure 19:
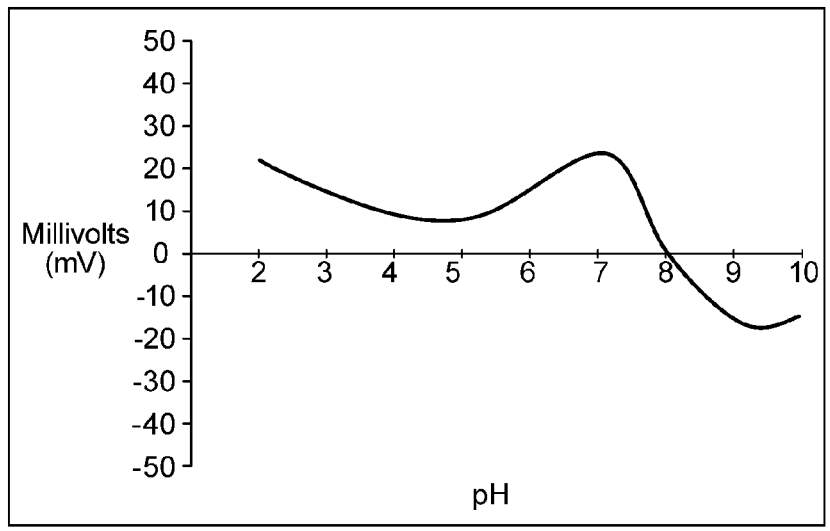

The criteria for categorizing hydrotalcite sources as Model C are as follows with reference to FIG. 19. Model C represents zeta potential forces that represent difficulties in process and performance. The IEP is greater than or equal to pH 8.0 as represented in FIG. 19.
when x=pH 7, y>0 mV
when y≦20 mV, x is any point between pH 3.0 and pH 7.0
IEP y=0, x≧pH 8.0

Model B (Borderline in Processing and Performance):

The zeta potential graph shown below (Model B) is very similar to Model A (representing improved processing and performance). However, the curve is shifted towards a higher pH and is skewed toward higher intensity at pH 3.0 than in Model A. This skewing of intensity between pH 3.0 and pH 7.0 may explain the dramatic drop in density from storage to high intensity mixing.

Figure 20:
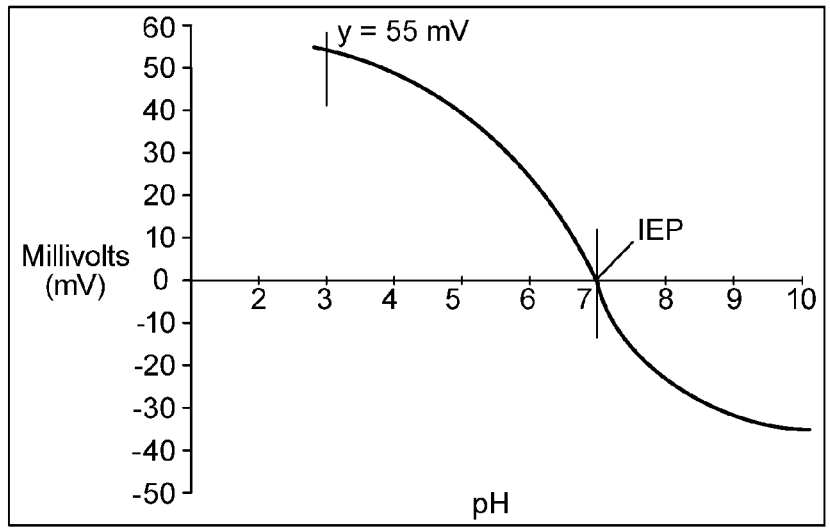

The criteria for categorizing hydrotalcite sources into Model B are as follows with reference to FIG. 20. Model B represents the zeta potential forces that represent borderline process and performance characteristics. The IEP is greater than 6.0 and less than pH 8.0 as represented in FIG. 20.
when x=pH 3.0, y is >45 mV
when x=pH 7.0, y is <0 mV
IEP=≧6.0 and <pH 8.0

Screening Hydrotalcite Sources for Stability

Dynamic heat stabilities of Sources 1-18 of Table 1 were provided under performance testing conditions of Brabender 190° C., 100 rpms, #6 head, sampling at 3 minute intervals. The vinyl formulation employed for each source included 2.25 grams of source hydrotalcite, 100 grams PVC, 25 grams phthalate plasticizer, 15 grams $CaCO_3$, 1 gram K-175 processing aid, 1 gram $TiO_2$, 0.75 gram zinc stearate, 0.1 gram dibenzoyl methane for a total of of 142.85 grams compound. The vinyl heat stabilizer portion of the formulation is represented by the addition of 0.75 gram zinc stearate, 0.1 gram dibenzoyl methane, and 2.25 grams of hydrotalcite source, for a total of 3.1 grams. All hydrotalcite sources showed commercial viability and almost all showed comparable stability (with the exception of Source 9) with reference to the degradation, color change, and change in acidity under performance testing conditions using the Brabender. Almost all sources, except for Source 9, did not degrade until over 30 minutes of testing with a similar adaptation of color change. The change in acidity was noted at about 9-15 minutes in all instances except for Source 9, which demonstrated lower degradation of about 18 minutes, with a change of acidity and color change at about 6 minutes.

TABLE 1

Commercial Sources of Hydrotalcites

| Source | Identity | |
|---|---|---|
| 1 | Alcamizer 1, Kisuma | Sources 1 though 8 are |
| 2 | Sorbacid 911, Sud Chemie | represented by $Mg_4Al_2(OH)_{12}CO_3 \cdot 3H_2O$ |
| 3 | Stabiace HT-1, Sakai | |
| 4 | Polylizer 120, Doobon | |
| 5 | Magcelar 1, Kisuma | |
| 6 | Hi Tal P1, Shin Woun | |
| 7 | AS 01, Akdeniz Kimya | |
| 8 | Naox 33, Toda Kogyo | |
| 9 | Alcamizer MHT-PD, Kisuma | Source 9 is represented by $Mg_4Al_2(OH)_{12}CO_3 \cdot 3H_2O$ calcinated |
| 10 | Alcamizer P-93, Kisuma lot H-18 | Sources 10 though 17 are represented by |
| 11 | Alcamizer P-93, Kisuma lot E-01 | $Mg_{3.5}Zn_{0.5}Al_2(OH)_{12}CO_3 \cdot 3H_2O$ |
| 12 | Hi-Tal P4 Shin Woun | |
| 13 | Sorbacid 944, Sud Chemie | |
| 14 | Polylizer 121, Doobon | |
| 15 | Naox 54, Toda Kogyo | |
| 16 | Naox 57, Toda Kogyo | |
| 17 | AS 04, Akdeniz Kimya | |
| 18 | Blank | |

With all hydrotalcite sources showing commercial viability and almost all showed comparable stability (except for Source 9), they were categorized based on the type of zeta potential curve exhibited upon testing for zeta potential.

Categorizing the Hydrotalcite Sources

Zeta potential curves (FIGS. 1-17) were then developed upon the 17 commercially viable hydrotalcite sources of Table 1 using the method outlined as follows:

Zeta-Potential Measurement of Hydrotalcites Method Description 0.5 grams of the sample are dispersed in 50 mls of 0.001 m KCl-solution by use of an Ultraturrax (duration: 1 min, frequency: 17500 r.p.m.). Non-dispersed sample is separated from the resulting solution.

Small portions of the solution (according to the kuvette volume) are adjusted to appropriate pH-values with 0.1 m HCl and 0.1 m NaOH, respectively, transferred to the kuvette of the instrument. Zeta-potential is determined with a Zeta-plus—instrument (Brookhaven Instruments) through measuring the electrophoretic mobility of the particles by light scattering and simultaneous measurement of the electrical conductivity of the dispersion (Smoluchowski-equation).

Results are given in a xy-diagram with pH value on the x-axis and zeta-potential on the y-axis. Isoelectric point (IEP) is defined as the pH-value, where zeta-potential is zero.

The curves were analyzed as to their resemblance to the three defined hydrotalcite zeta potential models and the results are reported in Table 2.

TABLE 2

Zeta Potential Curves 1-17 Analyses

| Source | IEP | mV @ pH 3.0 | mV @ pH 7.0 | Model Type |
|---|---|---|---|---|
| 1 | 5.2 | 40 | −60 | A |
| 2 | 5.4 | 45 | −25 | A |
| 3 | 4.5 | 35 | −45 | A |
| 4 | NA | 5 | 35 | C |
| 5 | NA | 50 | 8 | C |
| 6 | 9.2 | 62 | 20 | C |
| 7 | 5.3 | 30 | −20 | A |
| 8 | 5.9 | 42 | −20 | A |
| 9 | 9.1 | 15 | 25 | C |
| 10 | 6.3 | 68 | −35 | B |
| 11 | 4.5 | 25 | −20 | A |
| 12 | 6 | 65 | −25 | B |
| 13 | 6.6 | 65 | −2 | B |
| 14 | 8.1 | 18 | 20 | C |
| 15 | 6.6 | 3 | −3 | C |
| 16 | 9.6 | 72 | 35 | C |
| 17 | 6.1 | 60 | −30 | B |

With reference to the Table 2, Model A sources included 1, 2, 3, 7, 8, and 11. Model B sources included 10, 12, 13, and 17. Model C sources included 4, 5, 6, 9, 14, 15, and 16.

The curves for each of the sources 1-17 in Table 2 are illustrated in FIGS. 1-17.

Processing and Performance Parameters

The various processing and performance parameters were then tested.

EXAMPLE 1

Drop in Density During High Intensity Mixing of Hydrotalcite Containing Stabilizer Test Method: The initial density of each source is measured and recorded via ASTM D 1895B method. Temperature and relative humidity is also recorded. In a 6 quart stainless steel mixing bowl, 400 grams of the hydrotalcite source or heat stabilizer being tested is placed and mixed for 20 minutes using a Kitchen Aid Professional 600 stand mixer with wire beater rotating 170 revolutions per minute (#8 speed). The density is again measured via ASTM D 1895B and recorded. The percent change in density of the sample mixed for 20 minutes compared to the initial value is determined.

Stabilizer formulation: 73% hydrotalcite variable, 24% zinc stearate, 3% dibenzoyl methane.

Analysis of Results:

| | Relative Humidity 45%, Temperature 75° F. | |
|---|---|---|
| | Variable | |
| Average drop in | Hydrotalcite alone | Heat Stabilizer |
| Model A | −8% | −6% |
| Model B | −31% | −23% |
| Model C | +5% | +1% |

EXAMPLE 2

Compaction of Hydrotalcite Containing Stabilizer in Bags, Drums and Sacs

Test method: A funnel is suspended above a 3 inch diameter cylinder. The funnel is filled with 200 grams of hydrotalcite variable to be tested and allowed to freely flow into the 3 inch cylinder. The hydrotalcite is leveled with a straight edge and a 5 pound weight which fits just inside the cylinder is placed to evenly rest on top of the hydrotalcite for a period of 24 hours. At the end of this period, the weight is removed and the hydrotalcite is poured onto a 60 mesh screen. The weight of the hydrotalcite retained on the screen is measured and the percent retained by weight is calculated.

Analysis of Results

| Average Percent Compaction | |
|---|---|
| Model A | 6% |
| Model B | 10% |
| Model C | 24% |

EXAMPLE 3

"Rat Holing" or Collection of Hydrotalcite Near an Orifice During Transfer

Test method: Approximately 150 grams of the hydrotalcite variable is poured at a rate of about 5 grams per second down the side of a 6 inch diameter stainless steel funnel with a 1 inch orifice at the bottom. The funnel is observed for the build up of hydrotalcite near the orifice and the amount is compared to standards revealing no build up, slight build up, moderate build up and heavy collection. The amount of powder was rated as to slight build up (1), slight to moderate build up (2), moderate build up (3), moderate to heavy build up (4) and heavy build up (5).

Analysis of Test Results

| Build up near opening of funnel | |
|---|---|
| Hydrotalcite sources from Model A | 2 slight to moderate build up |
| Hydrotalcite sources from Model B | 2 slight to moderate build up |
| Hydrotalcite sources from Model C | 4 moderate to heavy build up |

EXAMPLE 4

Clogging of Screen Pack

Representative hydrotalcite sources from models A and C were made into a heat stabilizer (same as in example 1 and used at 3 parts per hundred of resin) which was then blended into a black, semi-rigid, vinyl formulation (same as used in the dynamic heat stability portion plus black pigment) and extruded for approximately 2 hours. The stabilizer containing a hydrotalcite from Model A shows a clean screen pack while the hydrotalcite from Model C shows a screen pack full of white particles (that analyzed as hydrotalcite) which subsequently clogged the screen pack and shut down the extruder line.

Model A No clogging of extruder screen pack
Model B No Model B used
Model C Severe clogging of extruder screen pack

EXAMPLE 5

Dispersibility with Vinyl Parts Dispersibility in Vinyl Test Procedure

1. Preheat the two-roll mill to a temperature of 325° F.
2. Using the balance, accurately weigh 400 g of vinyl masterbatch into a clean container.
3. Masterbatch formulation:

| PVC homopolymer resin (0.95 IV) | 250.0 g |
|---|---|
| DIDP plasticizer | 125.0 g |
| Zinc stearate | 1.8 g |
| Dibenzoyl methane | 0.2 g |
| Black color concentrate | 0.5 g |

4. Accurately weigh 5.6 grams of the hydrotalcite source variable onto weighing paper.
5. Prepare the surface of the mill by adding a clean up vinyl compound. Use this compound to clean the mill before each test.
6. Set the mill at 20 rpm, add the masterbatch and flux the compound a vinyl sheet. Mill for 2 minutes.
7. Add the test variable at 2 minutes and mix the fluxed sheet at 2 minutes, 30 seconds; at 3 minutes and at 3 minutes, 30 seconds.
8. Cut the fluxed vinyl sheet at 4 minutes and lay flat with mill side up to cool.
9. When cooled, cut a 10 inch by 12 inch area in the center of each sheet for evaluation.
10. Under good light, closely review the sheet for evidence of non-dispersed particles as evident by fine white spots on the surface of the sheet. Circle each spot.
11. Record the number of particles per 10"×12" area.

Test Procedure: Vinyl Dispersion Test

The hydrotalcite sources from Models A, B and C were processed into a black vinyl sheet and examined for the presence of white particles while being compared to a black vinyl sheet with no hydrotalcite (Source #18).

| Analysis of results: | Average Number of White Particles |
|---|---|
| Hydrotalcite sources from Model A | 15 |
| Hydrotalcite sources from Model B | 28 |
| Hydrotalcite sources from Model C | 112 |

EXAMPLE 6

THWN and THWN-2 Wire Testing

Volume resistivity testing under ASTM D 257-07 wet method (THWN-2 vinyl wire insulation) was run on vinyl samples made with the same stabilizer formulation as in the screening of hydrotalcite sources for stability and where the various sources were substituted for the hydrotalcite portion. The vinyl test formulation consisted of 100 parts of PVC resin, 40 parts trimellitate plasticizer, 10 parts electrical grade clay and 0.5 parts 165 paraffin wax. The heat stabilizer was added at 3.1 parts which consisted of 2.25 parts of hydrotalcite from the various sources. These vinyl samples were placed in 105° F. water for THWN-2 vinyl wire insulation simulation for a total of 26 weeks. The volume resistivity was determined weekly. A failure was noted when the volume resistivity dropped a power of 10 for two consecutive weeks.

| Analysis of test results: | Average Week of Failure |
|---|---|
| Hydrotalcite sources in Model A | Passed 26 weeks |
| Hydrotalcite sources in Model B | No Model B used in THWN-2 |
| Hydrotalcite sources in Model C | Failed in 21 weeks |

Summary of Results

| SITUATION | Zeta Potential Model A | Zeta Potential Model B | Zeta Potential Model C |
|---|---|---|---|
| 1. Average % Drop in Density As hydrotalcite source As a hydrotalcite containing stabilizer | −8% Good −6% | −31% Poor −23% | +5 Poor (blender balls) +1 Poor |
| 2. Average % Compaction, hydrotalcite | 6% Good | 10% Satisfactory | 24% Poor |
| 3. "Rat Holing" | 2 Slight to moderate Good | 2 Slight to moderate Good | 4 Moderate to heavy Poor |

| SITUATION | Zeta Potential Model A | Zeta Potential Model B | Zeta Potential Model C |
|---|---|---|---|
| 4. Clogging of Extruder Screen Packs | No clogging Good | | Severe clogging Poor |
| 5. Dispersibility in Vinyl (poor surface quality) Average # of white particles | 15 Good | 28 Satisfactory | 112 Poor |
| 6. Electrical Resistivity, THWN-2 Wire Simulation, ASTM D 257-07 Average week of failure | Passed 26 weeks | Not used in THWN-2 | Failed 21 weeks |

Examples 1 through 6 Discussion

| | Model A | Model B | Model C |
|---|---|---|---|
| Processing & Performance Model Boundaries | x = pH 7, y > −60 mV but < −20 mV<br>x = pH 3, y > 20 mV but ≦ 45 mV<br>IEP y = 0, x > pH 3.0 but < pH 6.0 | x = pH 7, y ≦ 0 mV,<br>x = pH 3, y > 45 mV<br>IEP y = 0, x ≧ pH 6.0 but < pH 8.0 | x = pH 7, y > 0 mV<br>x = any point between pH 3.0 and 7.0, y ≦ 20 mV<br>IEP y = 0, x ≧ pH 8.0 |
| | Example 1: Density Shift from Storage to High Intensity Mixing | | |
| Correlation from field to zeta potential conditions. | Storage: no free energy, particles are in static state similar to zeta potential pH 7.0.<br>High intensity mixing: high levels of free energy given to hydrotalcite particles similar to zeta potential pH 3.0 | Same as Model A | Same as Model A |
| Zeta potential expression | Storage: x = pH 7.0, y is ≧ −60 mV and < −20 mV moderate to high negative repelling forces<br>High intensity mixing:<br>x = pH 3.0, y > 20 mV and ≦ 45 mV moderate positive repelling forces | Storage: x = pH 7.0, y ≦ 0 mV mild repelling to strong attractive forces in this area.<br>High intensity mixing:<br>x = pH 3.0, y > 45 mV strong repelling forces in this area | Storage: x = pH 7.0, y > 0 mV slight attractive forces to strong positive repelling forces<br>High intensity mixing:<br>x = all points between pH 3.0 ≦ 20 mV slight repelling to strong attractive forces |
| Test Results | Hydrotalcite sources & their stabilizers averaged a drop of 8% and 6%, respectively, from storage to high intensity mixing. | Hydrotalcite sources & their stabilizers averaged a drop of 31% and 23%, respectively from storage to high intensity mixing. | Hydrotalcite sources and their stabilizers averaged an increase of 5% and 1% respectively. Blender balls formed due to agglomeration (attractive forces between particles) |
| Conclusions | Density shifts are minimized from storage to mixing since the negative forces at storage (pH 7) are similar to positive forces at high intensity mixing (pH 3). Model A does not display any processing difficulties. | Density shifts are magnified from storage to high intensity mixing since the mild forces at storage (pH 7) are less than the very strong repelling forces during high intensity mixing. The density shifts become more repelling causing more "fluffiness". | Density shifts could be magnified if at pH 7, y is > 35 mV during storage and at pH 3, if y is > 0 but ≦ 20 mv during high intensity mixing. These shifts become more attractive causing blender balls to develop. |
| | Example 2: Compaction during Storage | | |
| Correlation from field to zeta potential conditions. | During storage, there is minimal movement and little free energy transferred to the hydrotalcite particle but compression may increase the attractive forces at pH 7 (zeta potential) | Same as Model A | Same as Model A |
| Zeta potential expression | Storage: pH 7.0, x = pH 7, y > −60 mV but < −20 mV compression may increase attractive forces but there is little if any movement of the hydrotalcite particle. During storage, there are moderate repelling forces with hydrotalcite sources in Model A. | Storage: pH 7.0 x = pH 7, y ≦ 0 mV. The repelling forces can be less that Model A, especially with those hydrotalcite sources with IEP points at 7.0 (strong attractive forces). | Storage: pH 7.0 x = pH 7, y > 0 mV The repelling forces can range from moderately attractive to moderately repelling. |
| Test Results | Test results show the hydrotalcite sources in Model A compact an average of 6% by weight. | Test results show the hydrotalcite sources in Model B compact on an average of 10% by weight. | Test results show the hydrotalcite souces in Model C compact on an average of 24% by weight. |
| Conclusions | Minimal compaction occurs during storage of hydrotalcite sources categorized in Model A possibly due to the moderate repelling forces observed at pH 7 on the zeta potential curve. | Compaction of hydrotalcite within Model B show slightly more compaction that Model A. This could be due to those sources that have an IEP point around 7.0 or that have y values near 0 at this pH point. | There seem to be more sources of hydrotalcite in Model C with values at pH 7 that show slightly attractive force. These sources will show compaction during storage. |

| | Model A | Model B | Model C |
|---|---|---|---|
| Processing & Performance Model Boundaries | x = pH 7, y > −60 mV but < −20 mV<br>x = pH 3, y > 20 mV but ≦ 45 mV<br>IEP y = 0, x > pH 3.0 but < pH 6.0 | x = pH 7, y ≦ 0 mV,<br>x = pH 3, y > 45 mV<br>IEP y = 0, x ≧ pH 6.0 but < pH 8.0 | x = pH 7, y > 0 mV<br>x = any point between pH 3.0 and 7.0, y ≦ 20 mV<br>IEP y = 0, x ≧ pH 8.0 |
| Example 3: Ratholing during Transfer | | | |
| Correlation from field to zeta potential conditions. | Transferring hydrotalcite containing stabilizers at high speeds in steel systems increases the free energy to the particles. This energy will correlate to lower pH (such as pH 3) on the zeta potential curve. | Same as Model A | Same as Model A |
| Zeta potential expression | x = pH 3.0, y > 20 mV and ≦ 45 mV. This is an area of moderate repelling forces where bridging and ratholing should not occur. | x = pH 3.0, y > 45 mV This is an area of moderate to high repelling forces | x = all points between pH 3 and pH 6, y ≦ 20 mV. Moderate to strong attractive forces at pH 3 which may cause bridging and ratholing. |
| Test Results | Test data shows slight to moderate bridging and ratholing. | Test data shows slight to moderate bridging and ratholing. Results similar to Model A. | Test data shows moderate to heavy build up causing bridging or ratholing. |
| Conclusions | The hydrotalcite sources in Model A should not show difficulties in bridging or ratholing during commercial transferring. | Same as Model A | The hydrotalcite sources in Model C may show significant bridging and ratholing when being transferred in a steel convey system. |
| Example 4: Clogging of Extruder Screen Packs | | | |
| Correlation from field to zeta potential conditions. | Extrusion of vinyl at high temperatures with sheering. Hydrotalcite containing stabilizers will experience increased free energy. This energy should correlate to around pH 3.0 on the zeta potential curves. | Same as Model A | Same as Model A |
| Zeta potential expression | High free energy: x = pH 3.0, y > 20 mV and ≦ 45 mV This is an area of moderate repelling forces where agglomeration or attraction should not occur. | High free energy: x = pH 3.0, y > 45 mv This is an area of moderate to high repelling forces. Agglomeration of hydrotalcite and clogging of screen packs should not occur. | High free energy: x = all points between pH 3 and pH 6, y ≦ 20 mV. Moderate to strong attractive forces may cause agglomeration of hydrotalcite particles. |
| Test Results | Actual plant extrusion processing did not develop clogged screen packs with hydrotalcite sources from Model A. | No data. | Actual plant extrusion developed severe clogging of screen packs with Model C type hydrotalcites. |
| Conclusions | The hydrotalcite sources in Model A should not develop screen pack issues due to agglomeration during vinyl extrusion. | The performance of hydrotalcite sources in Model B should be similar to Model A. However, due to high repelling forces at pH 3, introduction into vinyl may be more difficult and may require more thorough mixing. | The hydrotalcite sources in Model C may develop severe screen pack issues during vinyl extrusion. |
| Example 5: Dispersibility in Vinyl (Poor Surface Quality of Vinyl Parts) | | | |
| Correlation from field to zeta potential conditions. | Processing vinyl is at high temperatures with shearing. Hydrotalcite containing stabilizers will experience increased free energy. This energy will correlate to low pH on the zeta potential curve (∼3.0). | Same as Model A | Same as Model A |
| Zeta potential expression | High free energy: x = pH 3, y > 20 mV and ≦ 45 mV This is an area of moderate repelling forces where agglomeration and poor dispersibility should not occur. | High free energy: x = pH 3, y > 45 mV This is an area of high repelling forces. Agglomeration and poor dispersibility in vinyl should not occur. | High free energy: x = all points between pH 3 and pH 6, y ≦ 20 mV. At pH 3, moderate to strong attractive forces may cause agglomeration, poor dispersibility and poor surface quality to vinyl parts. |
| Test Results | Test data shows hydrotalcite sources in Model A to produce an average of 15 particles in a black 10" × 12" vinyl sheet. | Test data shows hydrotalcite sources in Model B to produce an average of 28 particles in a black 10" × 12" vinyl sheet. | Test data shows hydrotalcite sources in Model C to produce an average of 112 particles in a black 10" × 12" vinyl sheet. |
| Conclusions | Hydrotalcite sources in Model A displayed the lowest number of particles of the three models. These hydrotalcites should provide the best dispersability and surface quality in vinyl parts. | Hydrotalcite sources in Model B performed similarly to Model A. These hydrotalcites should provide satisfactory dispersion and surface quality. However, due to high repelling forces at pH 3, introduction into vinyl may be more difficult with these hydrotalcites, requiring more thorough mixing. | The hydrotalcite sources in Model C produced a much higher number of particles than Models A and B. This may cause agglomeration, dispersibility and surface quality issues in vinyl parts. |

-continued

| Processing & Performance Model Boundaries | Model A<br>x = pH 7, y > −60 mV but < −20 mV<br>x = pH 3, y > 20 mV but ≦ 45 mV<br>IEP y = 0, x > pH 3.0 but < pH 6.0 | Model B<br>x = pH 7, y ≦ 0 mV,<br>x = pH 3, y > 45 mV<br>IEP y = 0, x ≧ pH 6.0 but < pH 8.0 | Model C<br>x = pH 7, y > 0 mV<br>x = any point between pH 3.0 and 7.0, y ≦ 20 mV<br>IEP y = 0, x ≧ pH 8.0 |
|---|---|---|---|
| | Example 6: Electrical Resistivity THWN-2 | | |
| Correlation from field to zeta potential conditions. | Processing vinyl wire at high temperature and shearing, submersion in water with exposure to electrical current. Hydrotalcite containing stabilizers will experience higher free energy. This energy will correlate to lower pH on the zeta potential curve (~pH 3) | Same as Model A | Same as Model A |
| Zeta potential expression | High free energy: x = pH 3, y > 20 mV and ≦ 45 mV. This is an area of moderate repelling forces that should prevent poor dispersibility in vinyl causing instability and poor electrical resistivity. | High free energy: x = pH 3, y > 45 mV These hydrotalcites should provide satisfactory dispersion and surface quality. However, due to high repelling forces at pH 3, introduction into vinyl may be more difficult with these hydrotalcites, requiring more thorough mixing. | x = all points between pH 3 and pH 6, y < 20 mV. At pH 3, moderate to strong attractive forces may cause agglomeration, poor dispersibility and poor surface quality to vinyl parts. |
| Test Results | The hydrotalcite sources in Model A passed resistivity testing after 26 weeks of exposure outlined in ASTM D 257-07. | No Model B hydrotalcites are used in THWN-2 wire. | The hydrotalcite sources in Model C on the average failed resistivity testing after 21 weeks of exposure outlined in ASTM D 257-07. |
| Conclusions | Passing the resistivity testing after 26 weeks of exposure signifies that the hydrotalcites in Model A stabilized vinyl, did not agglomerate, and dispersed well in vinyl. | No Model B hydrotalcites are used in THWN-2 wire. | Failure on the average of 21 weeks of exposure indicates a problem not with stability but with dispersibility in vinyl. Agglomerations cause pockets of instability and poor electrical resistivity. |

Source analytical data and performance data are summarized in the following Tables 3 and 4.

TABLE 3

Source Analytical Data

| | Source # | Al | Mg | Zn | Fe | Pb | Coating* | pH | Median (mm) | 90%-Quantile (mm) | Spec. Surface (m2/g) | IEP |
|---|---|---|---|---|---|---|---|---|---|---|---|---|
| Alcamizer 1, Kissuma | 1 | 11.7% | 21.2% | | 0.01% | <0.01% | 1.5% | 9.0 | 1.48 | 4.57 | 8.50 | 5.2 |
| Sorbacid 911, Süd Chemie | 2 | 10.7% | 21.7% | | 0.01% | <0.01% | 2.0% | 9.2 | 1.37 | 7.10 | 8.06 | 5.4 |
| Stabiace HT-1, Sakai | 3 | 11.1% | 20.5% | | 0.01% | <0.01% | 3.0% | 8.6 | 1.86 | 8.06 | 9.31 | 4.5 |
| Polylizer 120, Doobon | 4 | 11.3% | 20.6% | | 0.01% | <0.01% | 1.7% | 8.7 | 4.95 | 15.57 | 11.03 | — |
| Magcellar 1, Kissuma | 5 | 11.1% | 21.2% | | 0.02% | <0.01% | 1.1% | 9.1 | 1.55 | 10.57 | 11.13 | — |
| Hi Tal P1, Shin Woun | 6 | 10.6% | 21.3% | | 0.01% | <0.01% | 1.9% | 9.0 | 1.33 | 4.20 | 10.76 | 9.2 |
| AS 01, Akdeniz Kimyasal | 7 | 11.1% | 21.0% | | 0.01% | <0.01% | 2.2% | 9.6 | 1.64 | 8.26 | 13.65 | 5.3 |
| Naox 33, Toda Kogyo | 8 | 11.0% | 21.0% | | 0.02% | <0.01% | 2.4% | 9.1 | 1.09 | 2.50 | 10.53 | 6.0 |
| Alcamizer MHT | 9 | 12.5% | 23.2% | | <0.01% | <0.01% | 2.1% | 10.8 | 1.09 | 2.70 | 10.42 | 9.1 |
| Alcamizer P-93, Kissuma lot H-18 | 10 | 10.7% | 15.4% | 13.8% | 0.01% | <0.01% | 1.3% | 9.1 | 1.35 | 3.84 | 10.59 | 6.3 |
| Alcamizer P-93, Kissuma lot E-01 | 11 | | | | | | | | | | | 4.5 |
| Hi-Tal P4, Shin Woun | 12 | 10.0% | 14.8% | 12.3% | <0.01% | <0.01% | 1.8% | 9.3 | 3.05 | 6.85 | 6.48 | 6.0 |
| Sorbacid 944, Süd Chemie | 13 | 10.7% | 15.6% | 13.0% | 0.01% | <0.01% | 1.7% | 8.8 | 2.74 | 9.33 | 12.36 | 6.8 |
| Polylizer 121, Doobon | 14 | 10.5% | 16.6% | 11.3% | 0.01% | <0.01% | 2.6% | 9.6 | 5.89 | 19.84 | 10.58 | 8.1 |
| Naox 54, Toda Kogyo | 15 | 9.6% | 18.2% | 10.7% | 0.02% | <0.01% | 2.9% | 8.9 | 1.16 | 3.57 | 8.56 | 6.6 |
| Naox 57, Toda Kogyo | 16 | 10.2% | 17.8% | 8.7% | 0.02% | <0.01% | 3.0% | 9.9 | 1.28 | 5.65 | 8.58 | 9.6 |
| AS 04, Akdeniz Kimyasal | 17 | 10.5% | 15.3% | 13.2% | 0.02% | <0.01% | 1.8% | 8.8 | 3.32 | 11.05 | 11.93 | 6.1 |
| Blank | 18 | | | | | | | | | | | |

*All samples coated with techn. Stearic acid

TABLE 4

Source Performance Data

| Sample | Source # | IEP | Dynamic Thermal Stability Degrad. | Dynamic Thermal Stability pH change | Color Change | % Density Change 20' mixing | Compaction % Retained | Dispersion # of Particles | Funnel Test Blockage 1 = slight, 5 = Heavy | VR Testing Resistivity | Zeta Curve Model A, B or C | Zeta Curve Comments |
|---|---|---|---|---|---|---|---|---|---|---|---|---|
| Alcamizer 1, Kissuma | 1 | 5.2 | 36' | 9' | 33' | −8.0 | 6.0 | 6.0 | 1.0 | passed 26 | A | |
| Sorbacid 911, Süd Chemie | 2 | 5.4 | 33' | 12' | 27' | 0.0 | 7.0 | 2.0 | 1.0 | passed 26 | A | |
| Stabiace HT-1, Sakai | 3 | 4.5 | 36' | 6' | 36' | −6.0 | 7.0 | 39.0 | 2.0 | passed 26 | A | |
| Polylizer 120, Doobon | 4 | — | 30' | 9' | 27' | 7.0 | 29.0 | 200+ | 4.0 | Failed 18 | C | IEP > pH 8 |
| Magcellar 1, Kissuma | 5 | — | 39' | 9' | 36' | 11.0 | 33.0 | 74.0 | 3.0 | Failed 24 | C | IEP > pH 8 |
| Hi Tal P1, Shin Woun | 6 | 9.2 | 39' | 9' | 27'** | recheck −22 | 5.0 | 81.0 | 2.0 | Failed 25 | C | IEP > pH 8 |
| AS 01, Akdeniz Kimyasal | 7 | 5.3 | 36' | 9' | 36' | −9.0 | 4.0 | 33.0 | 2.0 | passed 26 | A | |
| Naox 33, Toda Kogyo | 8 | 6.0 | 36' | 9' | 36' | 12.0 | 9.0 | 5.0 | 2.0 | passed 26 | A | |
| Alcamizer MHT | 9 | 9.1 | 18' | 6' | 6' | 16.0 | 23.0 | 87.0 | 4.0 | Failed 16 | C | IEP > pH 8 |
| Alcamizer P-93, Kissuma lot H-18 | 10 | 6.3 | 36' | 9' | 36' | −41.0 | 8.0 | 1.0 | 3.0 | NA THWN-2 | B | pH 3, y > 45 |
| Alcamizer P-93, Kissuma lot E-01 | 11 | 4.5 | 36' | 9' | 36' | −11.0 | 3.0 | 4.0 | 2.0 | NA THWN-2 | A | |
| Hi-Tal P4, Shin Woun | 12 | 6.0 | 30' | 15' | 30' | −28.0 | 9.0 | 3.0 | 1.0 | NA THWN-2 | B | pH 3, y > 45 |
| Sorbacid 944, Süd Chemie | 13 | 6.8 | 36' | 12' | 30' | −26.0 | 18.0 | 76.0 | 2.0 | NA THWN-2 | B | pH 3, y > 45 |
| Polylizer 121, Doobon | 14 | 8.1 | 36' | 12' | 30'** | 10.0 | 29.0 | 200+ | 5.0 | NA THWN-2 | C | IEP > pH 8 |
| Naox 54, Toda Kogyo | 15 | 6.6 | 33' | 15' | 30' | 9.0 | 25.0 | 75.0 | 3.0 | NA THWN-2 | C | |
| Naox 57, Toda Kogyo | 16 | 9.6 | 36' | 12' | 30' | 8.0 | 24.0 | 72.0 | 4.0 | NA THWN-2 | C | IEP > pH 8 |
| AS 04, Akdeniz Kimyasal | 17 | 6.1 | 33' | 12' | 30' | −30.0 | 7.0 | 32.0 | 2.0 | NA THWN-2 | B | pH 3, y > 45 |
| Blank | 18 | | 3' | 0' | 3' | | | 3.0 Compacts in Storage Too Light, Packaging Problems Too Dense, Blender Balls | | | | |

*All samples coated with techn. Stearic acid
**Orange Hue

Conclusions

The zeta potential curves of the hydrotalcite sources in Model A, B and C are characterized as sigmoid. The group Model A curves differ from the other two models in that the IEP values (y=0 mV) of about pH 3 to 6 are in the lowest pH range of the three models. There is an important positive range for y at pH 3.0 (y is >20 mV but <45 mV) along with a negative range at pH 7.0 (y is ≧−60 mV but <−20 mV). These values create phenomena where the hydrotalcite particles are gently separated with little net difference in force intensities under processing and performance situations described herein. The hydrotalcites that demonstrate these phenomena will show improved performance and processing when used between the levels of 30% to 90% in a vinyl heat stabilizer. From the observations made with the hydrotalcite sources assigned to Model A, it would appear that the optimum zeta potential curve for processing and performance would be a balanced sigmoid curve with an inflection point (IEP) around pH 5 and the highest positive point of 35 mV reaching around pH 3.0 and the lowest negative point of −35 mV reaching around pH 7.0. However, the best mode of practicing the invention employs the zeta potential curves of group Model A.

The hydrotalcite curves the make up Model B appear similar to Model A but their IEP values are higher in a range between pH 6.0 and less than pH 8.0. These values may cause slightly poorer performance in areas such as during storage and related areas like dispersability and electrical resistivity since the attractive forces are somewhat stronger than in Model A and compaction may occur. The more significant phenomena associated with the zeta potential curves of hydrotalcite sources categorized in Model B is the disparity between attractive and repelling forces when moving from a storage situation at pH 7.0 to that of a high intensity mixing situation at pH 3.0. Group Model A curves display very little net change in intensity (same intensity but moving from negative to positive). Model B sigmoid curves show a much larger change (slightly attractive to strongly repelling). This disparity in force intensity may explain the large drop in density when moving from storage to high intensity mixing.

The zeta potential curves of hydrotalcite sources in Model C are hard to define in that they displayed many different shapes. Zeta potential areas in common appear to be a high IEP point of pH 8.0 or greater, positive mV values at pH 7.0 that seem to drop to near 0 mV or stay constant under +20 mV (from pH 6 to pH 3). The net result is that there appears to be strong attractive forces that could cause compaction during storage, the formation of blender balls during high intensity mixing, rat holing during transfer, clogging of extruder screen packs, poor dispersiblity in vinyl, poor surface quality of vinyl parts and poorer electrical resistivity.

These phenomena were observed between various hydrotalcite sources but also between various lots within a hydrotalcite source. No one hydrotalcite source when used in a heat stabilizer provides better processing and performance characteristics than another but a hydrotalcite that displays the preferred zeta potential curve of Group Model A when used in a heat stabilizer should provide improved processing and performance characteristics over others.

Having described this invention, its advantages and operating parameters, it will be obvious to persons of ordinary skill in the art, in view of the above description, that variations hereof may be made without departing from the spirit and scope thereof.

What is claimed is:

1. A method of making a storage stable and processable particulate solid heat stabilizer composition for a vinyl halide polymer comprising identifying hydrotalcite particles represented by a sigmoidal curve on a cartesian coordinate plot of zeta potential (mV) versus pH, said curve having negative zeta potential values balanced against positive zeta potential values over a pH range, said curve having an inflection point between a pH of about 3 and about 6 representing the isoelectric point (IEP) between said negative and positive zeta potential values, mixing about 30% by weight to about 90% by weight of said hydrotalcite particles with a particulate solid heat stabilizer based on the total solids of the stabilizer composition to provide an essentially free flowing, storage stable, and processable stabilizer composition upon mixing components of the composition and blending with a vinyl halide polymer in effective amounts to confer heat stabilizing effectiveness upon said polymer.

2. The method of claim 1 wherein the negative zeta potential values at a pH of about 7 are between about −60 mV and about −20 mV and the positive zeta potential values at a pH of about 3 are between about 20 mV and about 45 mV.

3. The method of claim 1, wherein the negative zeta potential value at a pH of about 7 is about −35 mV and the positive zeta potential value at a pH of about 3 is about 35 mV and said inflection point is at a pH of about 5.

4. The method of claim 1, wherein the hydrotalcite particles are Mg/Al-based hydrotalcite particles are represented by the formula selected from the group consisting of $Mg_4Al_2(OH)_{12}CO_3 \cdot 3H_2O$;

$Mg_4Al_2(OH)_{12}CO_3 \cdot 3H_2O$ calcinated, and $Mg_{3.5}Zn_{0.5}Al_{12}(OH)_{12}CO_3 \cdot 3H_2O$, and mixtures thereof.

5. The method of claim 1 wherein the particulate solid heat stabilizer is an inorganic, organometallic or organic compound.

6. The method of claim 1 wherein the hydrotalcite particles are coated with a carboxylic acid selected from the group consisting of: stearic, isostearic, hydroxystearic, palmitic, behenic, myristic, pelargonic and lauric acids.

7. The method of claim 6 wherein the carboxylic acid is stearic acid or lauric acid.

8. The method of claim 1 wherein said mixing and blending steps are conducted together with the vinyl halide polymer to heat stabilize the polymer.

9. The method of claim 1 wherein the vinyl halide polymer is a chlorine-containing polymer.

10. The method of claim 9 wherein the chlorine-containing polymer is polyvinylchloride (PVC) or chlorinated polyvinyl chloride (CPVC).

11. The method of claim 5 with the particulate solid heat stabilizer compound having a metal selected from the group consisting of lithium, sodium, potassium, magnesium, calcium, strontium, barium, zinc, aluminum, lanthanum, cerium, tin, rare earth metals and mixtures thereof.

12. The method of claim 11 wherein the metal compound stabilizer is a metal carboxylate.

13. The method of claim 1 wherein the stabilizer is present in an amount from about 0.5 to about 15 parts based on 100 parts by weight of the polymer, and the hydrotalcite particles are in an amount of about 0.2 to about 13.5 parts based on 100 parts by weight of the polymer.

* * * * *